(12) United States Patent
DHooge

(10) Patent No.: US 10,189,088 B2
(45) Date of Patent: Jan. 29, 2019

(54) TUBULAR CONNECTION REFACING APPARATUS AND METHODS

(71) Applicant: Reface Systems, LLC, Billings, MT (US)

(72) Inventor: Patrick DHooge, Lewistown, MT (US)

(73) Assignee: REFACE SYSTEMS, LLC, Laurel, MT (US)

( * ) Notice: Subject to any disclaimer, the term of this patent is extended or adjusted under 35 U.S.C. 154(b) by 0 days.

(21) Appl. No.: 15/476,880

(22) Filed: Mar. 31, 2017

(65) Prior Publication Data

US 2017/0209934 A1      Jul. 27, 2017

Related U.S. Application Data

(62) Division of application No. 14/463,472, filed on Aug. 19, 2014, now Pat. No. 9,623,485.

(60) Provisional application No. 61/867,488, filed on Aug. 19, 2013.

(51) Int. Cl.
*B23B 5/16* (2006.01)
*B23B 1/00* (2006.01)

(52) U.S. Cl.
CPC .............. *B23B 5/161* (2013.01); *B23B 5/162* (2013.01); *B23B 5/163* (2013.01); *B23B 2215/72* (2013.01); *B23B 2220/04* (2013.01); *Y10T 82/10* (2015.01); *Y10T 82/22* (2015.01)

(58) Field of Classification Search
CPC ........... B23B 5/16; B23B 5/161; B23B 5/162; B23B 2215/72; Y10T 82/22; Y10T 82/2522; Y10T 82/2512; Y10T 82/2529
See application file for complete search history.

(56) References Cited

U.S. PATENT DOCUMENTS

| | | | |
|---|---|---|---|
| 1,719,599 A | 7/1929 | Dickson | |
| 2,211,183 A | 8/1940 | Tytus et al. | |
| 2,383,050 A * | 8/1945 | Esson | B23B 29/03432 82/1.4 |
| 3,124,024 A | 3/1964 | Pittman | |
| 3,181,398 A | 5/1965 | Rogers | |
| 3,367,219 A | 2/1968 | Walters | |

(Continued)

OTHER PUBLICATIONS

PCT International Search Report for corresponding PCT International Patent Application No. PCT/US14/51609, dated Dec. 10, 2014.

*Primary Examiner* — Nicole N Ramos
(74) *Attorney, Agent, or Firm* — Holland & Hart LLP

(57) ABSTRACT

An apparatus and method of using an apparatus for refacing a tubular connection is provided. In one example, the apparatus has a mandrel connectable to a threaded portion of a tubular connection and two face plates bearing cutters for refacing surfaces of the tubular connection. In this example, the cutting is controlled by an engaging nut moving along a threaded portion of a drive shaft, and the two face plates may be spaced apart at a fixed distance to maintain the distance between the torque-stop surface and the primary surface after refacing. Also, the apparatus uses a locking pin to assist in tightening or loosening the mandrel into place using the remainder of the apparatus. An air-oil system is provided to supply air and oil to the cutting surfaces as the apparatus refaces the shoulders of the connection. An exemplary pin refacer and an exemplary box refacer are both disclosed.

20 Claims, 22 Drawing Sheets

(56) References Cited

U.S. PATENT DOCUMENTS

| | | |
|---|---|---|
| 3,561,302 A | 2/1971 | Keener |
| 3,691,882 A | 9/1972 | Massey |
| 3,717,055 A | 2/1973 | Pendleton |
| 4,114,484 A | 9/1978 | Feamster, III |
| 4,130,034 A | 12/1978 | Benoit |
| 4,149,436 A * | 4/1979 | Blattler ............... B23B 5/163 144/205 |
| 4,257,289 A | 3/1981 | Groothius |
| 4,387,612 A * | 6/1983 | Eckle ................. B23B 51/106 409/146 |
| 4,422,356 A * | 12/1983 | Pertle ................. B23B 5/162 82/113 |
| 4,430,913 A | 2/1984 | Williamson |
| 4,433,598 A * | 2/1984 | Murray ............... B23B 51/106 30/97 |
| 4,437,366 A * | 3/1984 | Astle ................. B23B 5/162 82/113 |
| 4,665,780 A | 5/1987 | Plaquin et al. |
| 4,677,884 A | 7/1987 | Kwech et al. |
| 4,709,604 A | 12/1987 | Rogers |
| 4,854,200 A | 8/1989 | Mynhier |
| 5,433,130 A | 7/1995 | Smith et al. |
| 5,852,962 A | 12/1998 | Fraering, Jr. |
| 6,050,161 A * | 4/2000 | Tremblay ............. B23B 5/162 82/113 |
| 6,189,425 B1 | 2/2001 | Ricci et al. |
| 6,220,130 B1 | 4/2001 | Beakley |
| 6,279,437 B1 | 8/2001 | Way |
| 6,460,434 B2 | 10/2002 | Robb |
| 6,604,442 B2 | 8/2003 | Zanin |
| 2001/0029817 A1 | 10/2001 | Strait |
| 2001/0045146 A1* | 11/2001 | Fisher ................. B23B 5/16 82/113 |
| 2010/0257981 A1* | 10/2010 | Frick ................. B23B 5/162 82/113 |
| 2011/0041658 A1* | 2/2011 | Weinberg ............ B23B 5/162 82/113 |
| 2012/0132044 A1 | 5/2012 | Manwaring |
| 2012/0180609 A1 | 7/2012 | Leblanc et al. |

* cited by examiner

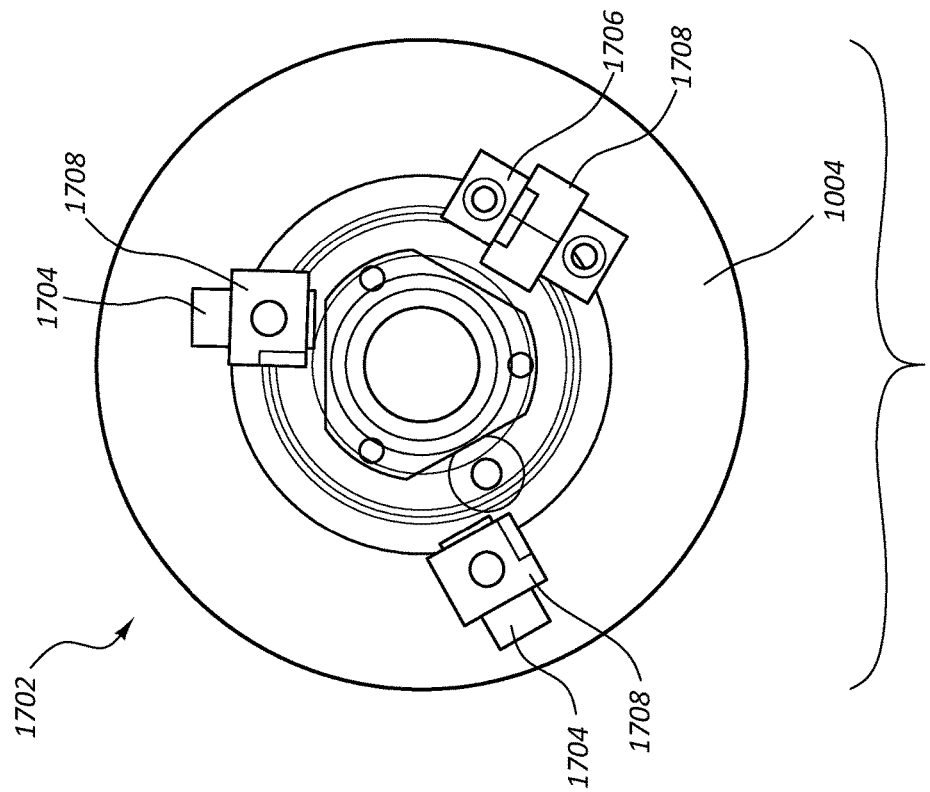
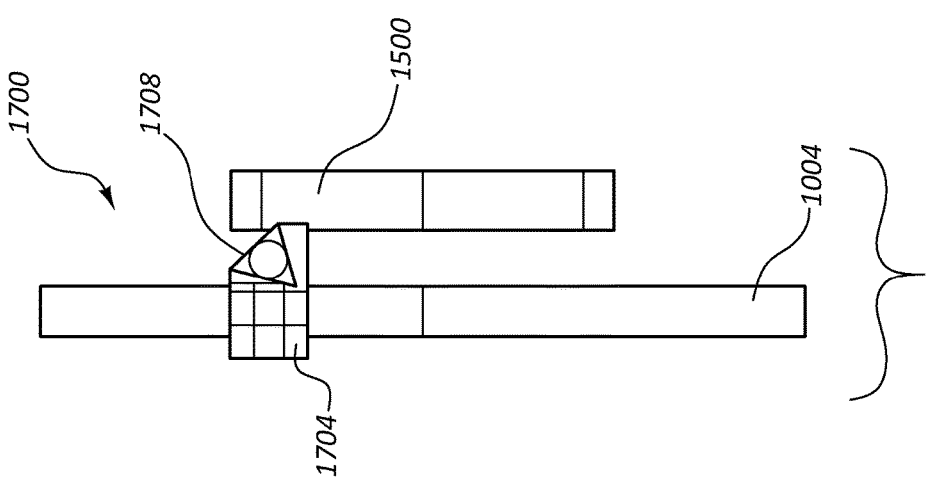

TUBULAR CONNECTION REFACING APPARATUS AND METHODS

CROSS REFERENCE TO RELATED APPLICATIONS

This application is a divisional application of, and claims priority to, U.S. patent application Ser. No. 14/463,472, filed 19 Aug. 2014 and entitled "TUBULAR CONNECTION REFACING APPARATUS AND METHODS," now U.S. Pat. No. 9,623,485 issued on 18 Apr. 2017, which claims the benefit of priority to provisional U.S. Patent Application Ser. No. 61/867,488, filed 19 Aug. 2013, and the disclosures of both of the above-enumerated applications are hereby incorporated in their entireties by this reference.

BACKGROUND

The following relates generally to apparatus for refacing tubular connections, including both double-shoulder and single-shoulder connections, with great accuracy and precision. The tools and methods described herein are particularly useful in the field of refacing drill pipe.

Tubular members, such as those used in oilfield applications, are often joined by threaded rotary shoulder connections. For example, rotary shoulder connections are used in the oil field to join sections of drill pipe and other related assemblies together. In a rotary shoulder connection, the shoulders, also referred to as faces and seals, are pressed together by the threads. The thread flanks jack against each other and push the shoulders into each other. The shoulders provide strength and integrity to the connection and also work as seals to seal fluid pumped through the inside of the pipe. In a conventional rotary shoulder connection, each piece of pipe to be connected has one face/seal. If the condition of the face/seal is not smooth, it can leak and result in a connection failure. In addition, over-torque of the connection can over-stress the threads and shoulder and cause a connection failure.

High torque connections overcome many of the disadvantages associated with conventional rotary shoulder connections. High torque connections involve two seals, a primary seal and secondary seal. In a high torque connection, the primary seal makes contact at the same time as the secondary seal. The secondary seal serves as a torque-stop which prevents the connection from being over-torqued and thereby avoids many of the disadvantages associated with conventional rotary shoulder connections.

Due to the primary and secondary seal design in high torque connections, it is critical that the length of the primary seal to the secondary seal remains the same. In establishing connections, both faces must be smooth and perpendicular to the thread direction to ensure a proper seal. If, however, a face is flawed or damaged with scratches, nicks, or other irregularities, it must be refaced prior to being used. During use of the pipe and assembly components, connections may be repeatedly made up and broken resulting in repeated face-to-face contact and wear. The resulting wear may result in sealing faces that are scored, nicked, or scratched or that no longer present a planar surface at right angles to the longitudinal axis of the pipe. When such conditions occur, the face-to-face contact may not form a proper pressure seal, thereby leading to connection failures. The connection must then be refaced prior to use.

Prior attempts to recondition the faces of pipe have employed methods that are costly or inconvenient and equipment that is expensive and/or unavailable in the field. For example, the faces may be re-tooled in a machine shop. However, re-tooling in a machine shop involves expensive and inconvenient transportation costs to transport the damaged/flawed pipe to the shop. There is a need for tools and/or methods for refacing high torque connections in the field.

U.S. Pat. No. 5,433,130 to Smith et al. describes portable shoulder dressing apparatuses. The shoulder dressing apparatuses include a mandrel, a mandrel securing means for securing the mandrel to the threaded end portion of the tubular connection; a piston assembly, the piston assembly being axially and rotatably movable relative to the mandrel; at least one cutter carried by said piston assembly; biasing means for applying a biasing force to the piston assembly to move the piston assembly axially relative the at least one shoulder and to urge the cutter into contact with the at least one shoulder, the biasing means being disposed between the mandrel and the piston assembly; and rotating means for rotating the piston assembly while the piston assembly is moved axially whereby the cutter can remove material from the at least one shoulder. In U.S. Pat. No. 5,433,130 the mandrel is attached to the connection via a threaded mandrel and the cutters are pressed into the shoulder to be refaced by a compression chamber employing pneumatic or hydraulic pressure.

U.S. Pat. No. 5,852,962 to Camille Fraering describes a field tool to reface high-torque pipe connections. The tool is known in the field as "The Lightning Refacer." The Lightning Refacer incorporates, inter alia, a spring-loaded cone that slides over the pin or box connection threads. The tool is held into position by the spring-loaded cone, then a rotating body mounted with tungsten carbide cutters and powered by a portable driver, such as an 8" angle grinder or Hole Hawg®, spins around the cone to reface the target surface.

The Lighting Refacer, however, has shortcomings when used in the field. For example, the tool operator must apply equal pressure, keeping faces at a right angle to the threads while pushing the refacing tool towards the connection faces. If unequal pressure is applied, the primary and secondary faces will be crooked with respect to the axis of the threads, and the length from one measurement to another measurement at 180 degrees away from the first will not be within acceptable tolerances. Maintaining equal pressure can be difficult for an operator resulting in crooked faces that are not within acceptable tolerances. In addition, even if equal pressure is applied, the refaced faces may still be crooked with respect to the axis of the threads if the tool is operated out of line with the axis of the threads. In addition, the tungsten carbide cutters can chip, causing irregularities on the face. Frequently, in high-torque connections used in drilling, the threads sharpen during repeatedly making up and breaking out the connection, resulting in threads that are raised and narrow. These sharpened threads impede the Lightning Refacer from easily sliding onto the threads. Furthermore, this the Lightning Refacer implements multiple mandrel elements, not only increasing the complexity and cost of the apparatus, but also decreasing the accuracy of the length dimension between the primary and torque-stop faces of the threaded connection.

U.S. Pat. Application No. 2012/0132044 to Manwaring describes a high-torque refacing tool using a mandrel with bearings and two face plates driven by a shaft-rotating driver, but has shortcomings in cleaning debris and shavings from the surfaces being refaced, and relies on a user to provide equal pressure across the entire surface being refaced.

SUMMARY

According to at least one embodiment, an apparatus for refacing tubular connections is described. Specific embodiments of the invention may allow for refacing of either the male end (pin) or the female end (box) of the tubular connection. The apparatus may include at least a mandrel having a first end and a second end and a drive system extending across the first and second ends of the mandrel. The drive system may be rotatable independent of the mandrel and may include an engagement portion, a distal faceplate, and a proximal faceplate. These faceplates may have one or more cutters. The apparatus may also include an engaging nut that is movably connected to the engagement portion of the driveshaft. The engaging nut may be linked to the distal and proximal faceplates and provide longitudinal movement of the cutters upon longitudinal movement of the engaging nut along the engagement portion of the driveshaft. The cutters can be adjusted longitudinally relative to the mandrel in order to bring the cutters closer to or farther from the pipe surface(s) to be refaced.

In some embodiments, the apparatus further comprises a lubricant-air system providing lubricant-laden air to the cutters. The apparatus may have the engagement portion as a threading on which the engaging nut is threaded. In some embodiments, the apparatus further comprises a drive unit that is operable to provide a torque to the drive system.

In another embodiment, an apparatus for refacing tubular connections is provided. The apparatus may include a mandrel and a driveshaft extending through the mandrel. The driveshaft may have a threaded portion and can rotate independent of the mandrel. A distal faceplate may be driven by the drive shaft, and the distal faceplate may have one or more cutters. A proximal faceplate may also be driven by the driveshaft and may have one or more cutters. On the threaded portion of the driveshaft, an engaging nut may be threaded that is linked to the distal and proximal faceplates. The engaging nut may provide longitudinal movement of the cutters of the faceplates as it moves longitudinally along the threaded portion of the driveshaft.

Another apparatus for refacing tubular connections is also described. It may have a cutter linkage positioned around a mandrel, which cutter linkage may include a distal faceplate and a proximal faceplate. The faceplates may have a plurality of cutters. A drive shaft may also be included which can provide a torque to the cutter linkage, thereby rotating the cutters. This driveshaft may have a threaded portion bearing an engaging nut. When the engaging nut advances on the threaded portion, the plurality of cutters of the cutter linkage may be advanced.

In another aspect, an apparatus for refacing tubular connections is provided that may comprise a mandrel having a first end and a second end. A drive system may extend across the first and second ends of the mandrel, wherein the drive system may be rotatable independent of the mandrel, and the drive system may include an engagement portion, a distal faceplate, and a proximal faceplate. The distal and proximal faceplates may be adapted to connect to a plurality of cutters. The apparatus may also comprise an engaging nut movably connected to the engagement portion of the drive system, wherein the engaging nut may be linked to the distal and proximal faceplates and provide longitudinal movement of the plurality of cutters upon longitudinal movement of the engaging nut along the engagement portion of the drive system.

Additionally, the engagement portion may be threaded to the engaging nut. The apparatus may also have a drive unit operable to provide a torque to the drive system. The plurality of cutters may be configured to engage at least two faces of a tubular connection simultaneously. The plurality of cutters may comprise at least a bevel cutter and a face cutter.

The mandrel may comprise a central opening configured to receive a tubular connection. In another embodiment, the mandrel may be configured to extend into an interior of a tubular connection. The mandrel may comprise threads that may be configured to threadably engage a tubular connection. The mandrel may also be rotationally lockable to the distal faceplate. For example, the mandrel may be rotationally lockable by a pin extending through the distal faceplate.

The proximal and distal faceplates may be linked around their outer perimeters, and/or may be are linked by a shaft centrally connected to the proximal and distal faceplates. The apparatus may also comprise a bearing positioned between the mandrel and the drive system.

In another embodiment, a method of refacing a tubular connection may be provided, with the method comprising at least attaching a mandrel to an end of a tubular connection and the tubular connection having at least one face. The mandrel may be connected to a cutter apparatus, with the cutter apparatus having a drive system and at least one faceplate configured to be driven by the drive system. The at least one faceplate may have at least one cutter. The method may further comprise rotating the at least one faceplate relative to the tubular connection using the drive system without simultaneously rotating the mandrel and advancing the at least one cutter into contact with the at least one face of the tubular connection, followed by removing material from the at least one face with the at least one cutter.

In some embodiments, attaching the mandrel to the end of the tubular connection may comprise synchronously rotating the mandrel and the cutter apparatus. The mandrel may also be threaded onto the end of the tubular connection.

In one of these methods, the at least one face of the tubular connection may include multiple faces, such as at least a proximal face and a distal face, and the at least one faceplate may comprise at least a proximal faceplate and a distal faceplate. In these embodiments, advancing the proximal and distal faceplates may include advancing the proximal faceplate toward the proximal face and advancing the distal faceplate toward the distal face. The proximal and distal faceplates may be advanced simultaneously.

In one method, the drive system may comprise a drive shaft threadably engaged to a drive nut, wherein the at least one cutter is advanced by rotating a drive nut relative to the drive shaft.

In another aspect of the disclosure, an apparatus for refacing a tubular connection is described, wherein the apparatus may include a mounting portion configured to mount to a tubular connection and a drive shaft rotatable independent of the mounting portion, wherein the drive shaft may have a threaded portion. A drive nut may engage the threaded portion of the drive shaft, with the drive nut being linked to a cutter configured to remove material from the tubular connection upon advancement of the cutter toward the tubular connection, and wherein the drive nut may be configured to travel along the threaded portion of the drive shaft upon the drive nut being held rotationally stationary relative to the drive shaft. In this apparatus, the mounting portion may mount to an inside surface or an outside surface of the tubular connection.

The foregoing and other features, utilities and advantages of the invention will be apparent from the following more particular description of a preferred embodiment of the invention as illustrated in the accompanying drawings.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 17A is a side view of a primary face plate of a box refacer.

FIG. 17B is an end view of a primary face plate of a box refacer.

Figure 1:
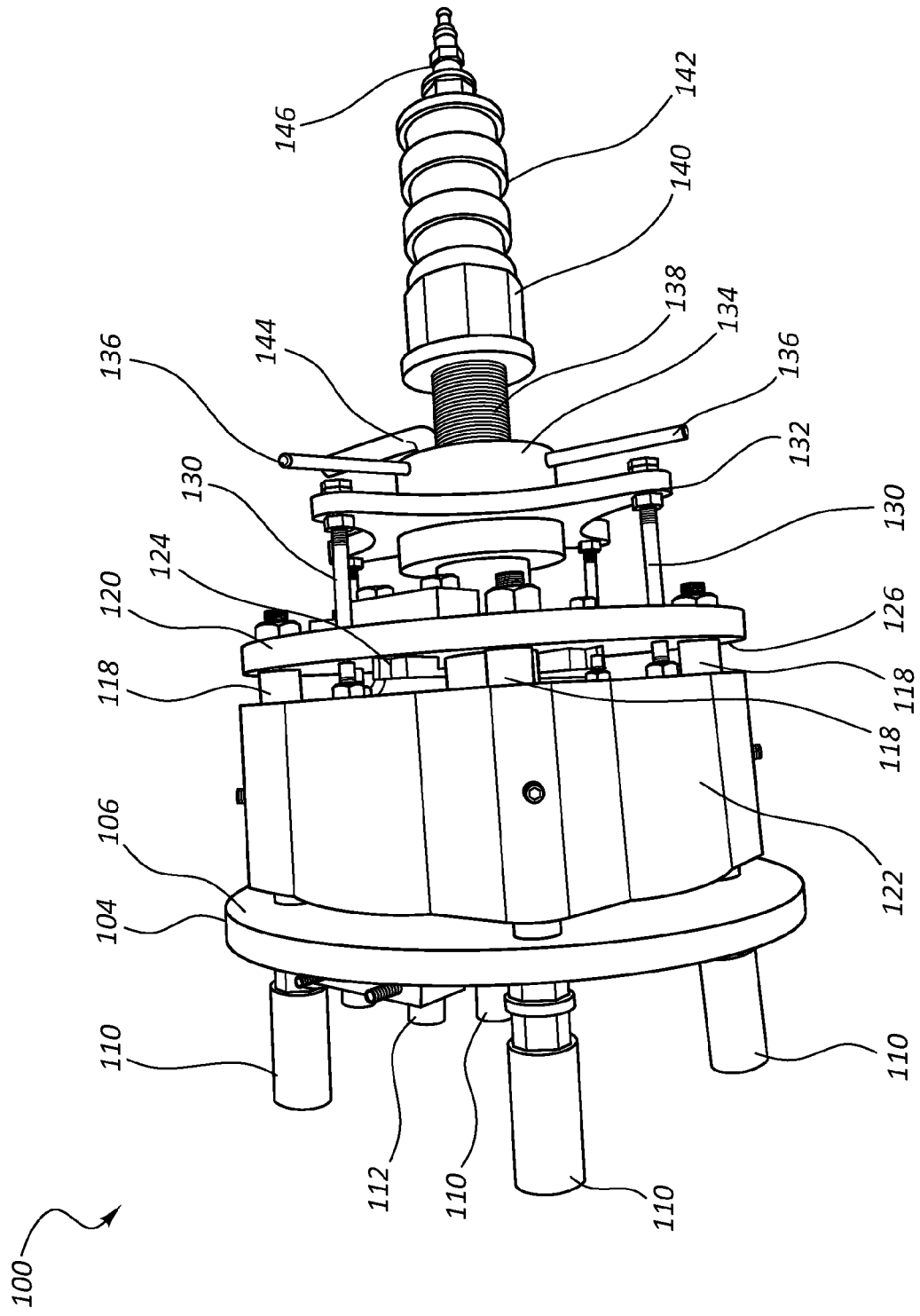
FIG. 1 is a perspective side view of an example pin refacer.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Apparatus, systems, and methods of refacing tubular connections are described herein. The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Embodiments of the present disclosure may provide advantages including, for example, improved safety in operation of a refacing apparatus; individual, simultaneous, or sequential cutting of faces; portability of a refacer which is movable to remote connection locations as needed; the ability to reface surfaces with a tool operating at relatively low speeds (RPM); interchangeability of plates leading to adaptability to different types of tubular connections; and precise resurfacing through precise cutter control and/or through injection of oil and air onto cutters and a cutting surface to clean and lubricate while resurfacing.

A connection refacer may be described in some instances as a pin refacer or a box refacer. In some instances, the refacer may be referred to as a tool. For example, a pin refacer may be a refacing apparatus configured to at least partially receive a threaded pin of a tubular connection to reface at least one of the primary and secondary faces of the pin. Similarly, a box refacer may be a refacing apparatus configured to be at least partially inserted into a threaded box of a tubular connection to reface at least one of the primary and secondary faces of the box. For purposes of this disclosure, a "pin connection" is a male connection threadably insertable into a female "box connection" of a tubular member. For example, such a tubular member may be an oilfield pipe. In some instances, the pin connection or box connection may be synonymously referred to as a workpiece of a refacing apparatus.

A refacing apparatus may include a mandrel. A mandrel may be threadably securable to the threaded end of the tubular connection. A mandrel may be provided with a mandrel securing means for securing the mandrel to the threaded end portion of the tubular connection. A mandrel securing means may include a wrench or other leveraging device which may be removable from the refacing apparatus. A pin mandrel may have a threaded inner surface for threadably engaging and fixably securing the pin mandrel to a threaded portion of a pin connection of a tubular member. A box mandrel may have a threaded outer surface for threadably engaging and fixably securing the box mandrel to a threaded portion of a box connection of a tubular member. A mandrel may be composed of a metal, an alloy, or a suitable composite or ceramic material. For example, the mandrel may be made of steel, stainless steel, aluminum, titanium, copper, brass, metal alloy, plastic composite, polymer composite, or carbon fiber composite. In addition, a mandrel may be covered with or constructed of hard materials such as tungsten or chrome. When a mandrel is threaded to the tubular connection, thereby attaching the tool to the tubular connection, the mandrel may maintain a perpendicular orientation of the face plates of the refacing apparatus with respect to the longitudinal axis of the connection or the direction of the threads of the connection. The mandrel may be advantageously removable and interchangeable on the refacing apparatus, providing increased flexibility to the types of tubular connections that a single refacing apparatus can provide.

A refacing apparatus may comprise a drive system. A drive system may transfer a torque or rotationally-urging force to various portions of the apparatus, such as, for example, in driving the rotation of face plates bearing cutters while against the shoulder faces of a workpiece. A drive system may include a shaft, which may be referred to as a drive shaft. A shaft may be composed of a metal, an alloy, or a composite suitable for driving refacing plates. For example, the shaft may be made of steel, stainless steel, aluminum, titanium, copper, brass, or metal alloy. The shaft may be cylindrical to accommodate its rotation with the aid of bearings, particularly in relation to the mandrel when the mandrel is fixed in the threads of a workpiece, but may have sections that are flattened or cubical to accommodate a wrench, lever, or another tightening tool. A flattened portion may be referred to as a drive nut. In some embodiments, the drive nut may be a separate part that is removably attachable to the drive shaft. In some embodiments, the drive system comprises a flattened portion for engagement with a drive unit. A drive system may be driven manually using handles such as handles connected to the drive shaft or connected to face plates attached to the drive shaft or which are otherwise locked in a stationary position relative to the drive shaft.

A drive unit may comprise a powered driving means. For example, the drive unit may be an electric motor-driven torque wrench or other shaft driving means. The drive unit may, for example, engage a portion of the drive system such as a drive nut and thereby provide a rotational torque to a drive shaft that is transferred to face plates and cutters.

The refacing apparatus may include one or more face plates. In some embodiments, two face plates are included. With two face plates, the refacing apparatus may advantageously reface multiple surfaces simultaneously, as described in further detail below. A face plate may have cutters positioned on a cutter mounting surface or cutter holder so that the cutters may be provided to the faces of the tubular connection during operation. In some embodiments, the cutter mounting surface may be a proximal or distal surface of the face plate. A face plate providing a cutter to a torque-stop face of a tubular connection may be referred to as a torque-stop face plate, and a face plate providing a cutter to a primary face of a tubular connection may be referred to as a primary face plate. A face plate may have a generally circular cutter mounting surface and a generally broad cylindrical shape. A torque-stop face plate may be sized to correspond with the diameter of the torque-stop face of a tubular connection, and, as such, may have varying dimensions to adapt to the target connection. Likewise, a primary face plate may be sized to correspond with the diameter of the primary face of the tubular connection and may vary in the diameter and size. A face plate may be composed of a metal, an alloy, or a suitable composite. For example, the torque-stop or primary face plate may be made of steel, stainless steel, aluminum, titanium, copper, brass, or metal alloy.

In some embodiments, face plates are mounted to the drive system or drive shaft. In a pin refacer, the threaded pin of the tubular connection is inserted through the primary face plate, so it is not directly driven by or in contact with a drive shaft. Thus, a face plate may also be linked to another face plate, such as a primary face plate in a pin refacer being linked around its perimeter to a torque-stop face plate.

In some embodiments, the face plates are adjustable or interchangeable, providing adaptability to many different sizes and shapes of tubular connections. For example, a face plate may be equipped with a bolt that can screw into a threaded hole in the drive shaft to attach the face plate to the drive shaft. Thus, an appropriately-sized face plate may be installed as needed by the tubular connection encountered without requiring a different refacing apparatus to perform a refacing. A removable or interchangeable face plate may facilitate easier cleaning and interchanging of cutting elements or abrasion surfaces. Thus, a face plate may be attached to the drive system using fasteners such as screws extending through a portion of the drive system and the face plate. Alternatively, the face plate may be welded or formed integrally with the shaft or another portion of the drive system.

Some configurations include face plates bearing apertures or passages for bearing or transferring oil and/or air flow to a cutting element positioned distally on the face plate. For example, the face plate may include an aperture for routing a tubing system from a proximal end of a drive system (e.g., exterior to the tubular connection) to a distal end of the face plate facing the refaced surface of the tubular connection.

In some embodiments, a peripherally linked system of face plates may have a barrel disposed between the face plates. A barrel may provide support for a bearing between the inner or outer surface of the barrel and a mandrel. A barrel may also be slidable along linkages that extend between the face plates so that the barrel (and bearing-held mandrel with the barrel) is movable in relation to the face plates.

In another example, a face plate includes a feature adapted for connection of a locking pin securing a face plate to the mandrel. For example, the feature may be an aperture through the face plate. The locking pin may be inserted through the aperture and then linked to the mandrel. In some embodiments, the locking pin is inserted into a locking recess or hole in the proximal portion of the mandrel. This recess or hole may be threaded or otherwise configured for removably securing a locking pin to the mandrel. Advantageously, the locking pin may have an elongated portion for positioning in the mandrel and face plate and may further comprise a handle portion extending normal from the elongated portion. Such a handle portion may assist in inserting, removing, and loosening the locking pin to and from the face plate and/or mandrel. One function of the locking pin may be locking the angular orientation of the face plate to the angular orientation of the mandrel, such as by linking their rotation about the central axis of the drive shaft. When installing a mandrel to a tubular connection, the mandrel may be separately rotatable from the drive system and other components of the refacing apparatus. This may lead to difficulty in properly inserting and tightening the mandrel onto or into the tubular connection, particularly when portions of the refacing apparatus cover the tubular connection opening (e.g., in a box refacer) or restrict access to the mandrel itself (e.g., in a pin refacer). A locking pin may advantageously lock the mandrel to the face plate or other portion of the drive system so that the mandrel may be properly tightened against the tubular connection by turning the drive system or face plate from a more accessible area of the apparatus. For example, with the locking pin in place, handles or wrenches may engage the face plate to thereby permit the user to rotate the entire apparatus in order to engage the mandrel into the pipe threads. The locking pin is then removed before using the tool to reface the surface(s) because, in use, the cutters rotate relative to the mandrel as described herein.

Furthermore, one or more face plates of a refacing apparatus may have a wrench or lever attachment means allowing a wrench or other lever to be connected to the face plate and turn the face plate. For example, a face plate may have an aperture or hole for receiving a portion of a lever that extends radially outward from the face plate. Such attachment means may also comprise a bolt or stem configured to be engaged by a wrench for rotating the face plate around its central longitudinal axis. In some embodiments, the face plate lockable to the mandrel includes a lever connection aperture for receiving a tightening lever or wrench that allows the apparatus to be tightened to the tubular connection using leverage from an easily accessible exterior area of the apparatus while the mandrel is locked to the face plate.

In some embodiments, a face plate incorporates handles. Handles may extend over or around the workpiece to assist in attachment or removal of the refacing apparatus from the workpiece while the locking pin is in an inserted position. In a pin refacer, the primary face plate may have one or more handles extending distally from its distal surface. Multiple handles may permit easier access to the handles while turning the apparatus. For example, the primary face plate may have four handles oriented peripherally around its perimeter or circumference. A box refacer may incorporate handles as knobs or extensions directed outward from a perimeter or circumferential surface of its primary face plate. For example, the primary face plate may have one or more radially-extending knobs or bars. The handles may provide leverage while attaching the mandrel to the tubular connection. In some configurations, the handles may be removably attached to a face plate, such as by a bolt extending through the axis of the handle and into a face plate or an element fixed to the faceplate.

In some embodiments, the face plates bear adjustable or repositionable cutters or other abrasive elements configured to be moved or reoriented from one portion of the face plate to another. In one example embodiment, the torque-stop face plate is configured to rotate and engage the torque-stop face of a box-end connection. A similar connection may be made for the primary face of the connection. This engagement may remove material from the faces to provide for a proper length between the torque-stop face and the primary face and/or may smooth the faces and remove irregularities, thereby providing for a proper seal in the tubular connection that is within acceptable tolerances.

A plurality of cutting elements, referred to herein generally as cutters, may be positioned on a distal surface of one or more face plates. A face cutter or face cutting element may remove material generally perpendicular to the longitudinal axis of the tubular member, and a bevel cutter or bevel cutting element may remove material at a beveled or angled direction from the axis of the tubular member. For example, a bevel cutter may remove material at a 45-degree angle from the central axis of the tubular connection. Advantageously, a refacing apparatus may be configured with two face plates, and in such embodiments the face plates may bear two face cutters and two bevel cutters. This configuration may allow both the torque-stop surface and the primary surface of a tubular member to be refaced (and beveled, if needed) simultaneously. Multiple cutters may be axially spaced on the same face plate, with bevel cutters additionally positioned at different axial lengths from the axial lengths of face cutters. The number of cutters employed may depend on the size of the connection to be refaced and the amount of material to be removed, since multiple cutters may provide faster removal of material. Cutters may be composed of tool steel, tungsten carbide, ceramics, or other suitable materials for refacing tubular members. In some examples, cutter tips may be attached in wedges or a machine taper in a face plate. It will be understood that cutters may also comprise abrasive elements, including without limitation sandpapers, abrasive discs, diamond coatings, powder-coated abrasives, or grit-based ceramics.

In some embodiments, cutters are removably attached to a face plate, providing easier servicing of parts and interchangeability and adaptability of the refacing apparatus to a variety of tubular connections. Interchangeability may be provided by a bolt or nut, such as a hex-nut inserted into a tapped hole. Additionally, removably attachable cutters may be repositioned on the face plates or replaceable with different cutters. In some embodiments, the cutters may be welded or integrally formed with the face plate to provide added ruggedness and rigidity to the cutters and the face plate may be at least partially removably interchangeable.

A refacing apparatus may also comprise an engaging nut. An engaging nut may be positioned on the drive shaft such as on a threaded portion of the drive shaft. The engaging nut may be proximally located on the threaded portion of the drive shaft proximal to the most proximal face plate. An engaging nut may have a plurality of radially-extending handles to assist in advancing and retreating the engaging nut along the threaded portion of the shaft. A distal portion of the engaging nut may contact a drive nut plate.

A drive nut plate may be linked to a proximal face plate and rotate with the proximal face plate when the shaft is driven. Therefore, when the engaging nut advances on the threaded portion of the drive shaft, such as when it advances toward a distal end of the drive shaft, the drive nut plate transfers this advancement to the face plates. Alternatively, retreat of the engaging nut may cause the face plates to retreat in a proximal direction in relation to the drive shaft. In some embodiments, the drive nut plate may be attached to the engaging nut, providing linkage of both advancement and retreat of the engaging nut to the face plates. The connection between the engaging nut and the drive nut plate may comprise a fit such as an interference fit so that the engaging nut does not translate along the axis of the drive shaft relative to the drive nut plate.

Advantageously, the engaging nut may be freely rotatable with respect to the drive nut plate. In this example, when the drive shaft rotates, the engaging nut rotates at the same angular velocity as the shaft due to the threaded connection between the shaft and an inside surface of the engaging nut. In this situation, when the engaging nut is held stationary the drive engaging nut will advance or retreat (depending on the direction of rotation of the shaft) along the threaded portion of the shaft due to the threading. Beneficially, the threaded portion of the shaft may be finely threaded to thereby provide slow and steady longitudinal motion of the engaging nut. As the engaging nut translates along the threaded portion, the face plates follow the translation with respect to the shaft via their link to the drive nut plate. Therefore, the engaging nut may provide fine-tuned control over the position of the face plates and ensure steady and even pressure of the face plate cutters against the workpiece when refacing uneven surfaces and removing burrs, scratches, and other elements of the shoulders that are not to specification.

In some embodiments, the refacing apparatus may include an oil-air system. An oil-air system may comprise an air supply (e.g., compressor), an oil reservoir, an oil-air routing system between the air supply and oil reservoir to the cutters. For example, a chuck may be positioned at a proximal end of the drive shaft linking a supply of compressed air and oil to a tube system through the drive shaft to a plurality of nozzles facing the cutting surfaces of the cutters on the refacing apparatus. The oil-air system advantageously may provide simultaneous cleaning and lubrication to the surfaces being refaced and the cutters. This may help to ensure a clean working surface for the cutters and to assist in clearing away debris and shavings from the refaced surface while also providing cooling and lubrication to preserve refaced shoulders and cutter surfaces. The oil-air system may also include an oil-air interface providing a mixture of atomized oil with compressed air as it is provided to the refacing apparatus.

Figure 2:
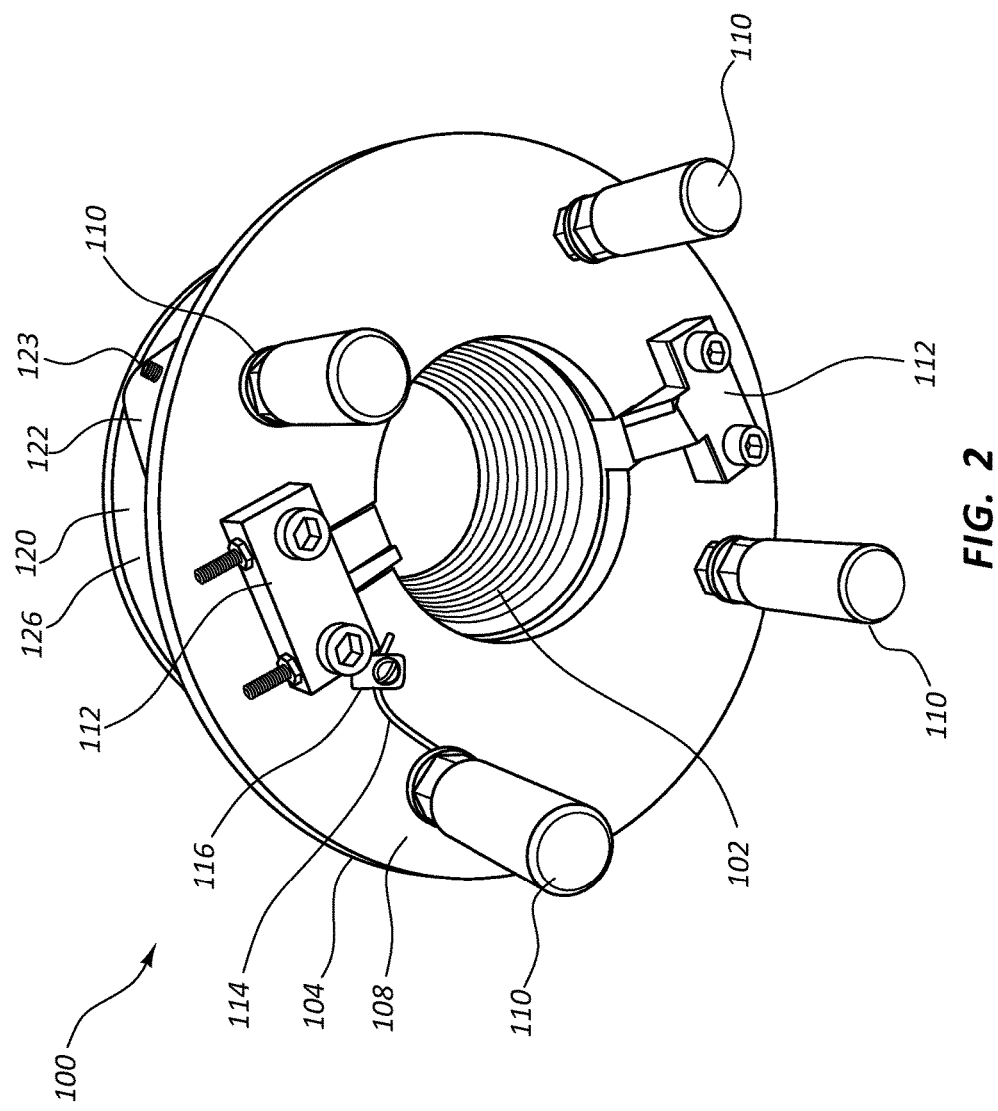
FIG. 2 is another perspective view of an example pin refacer.
Figure 3:
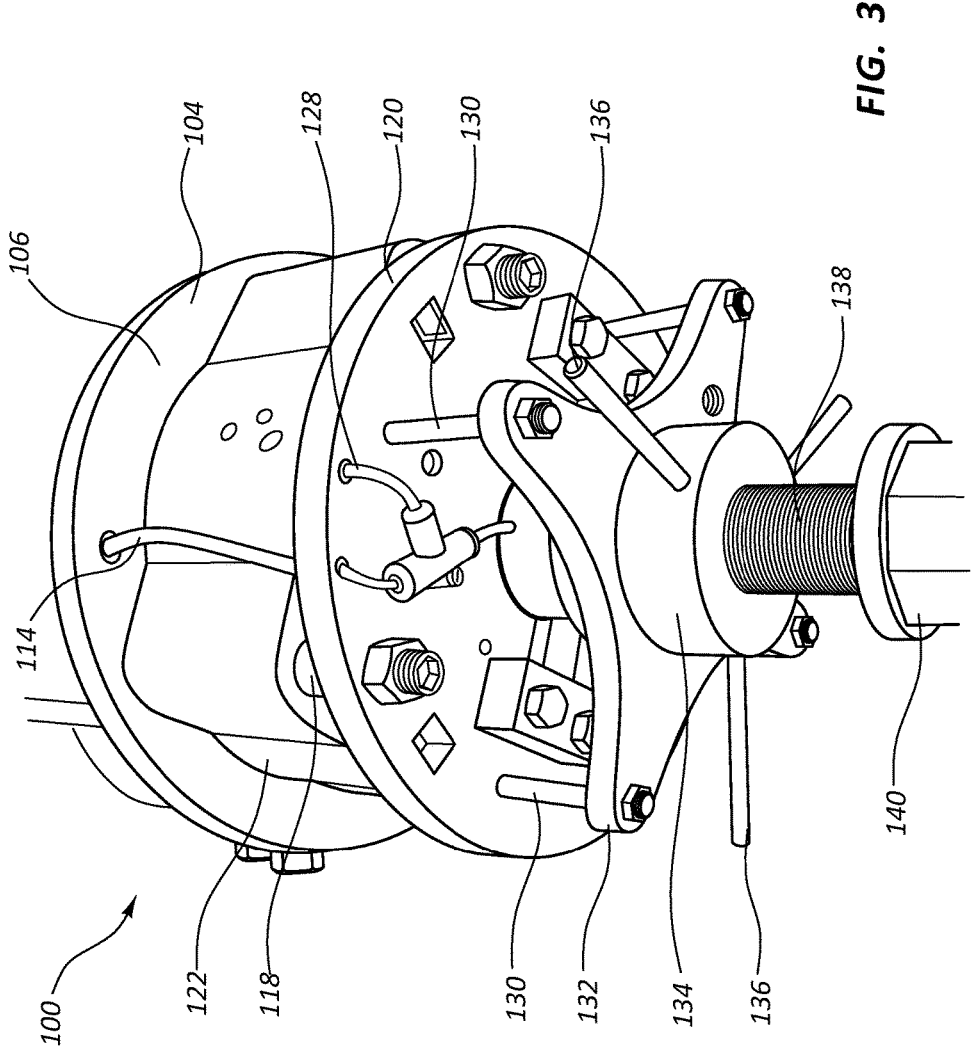
FIG. 3 is another perspective view of an example pin refacer.

Turning now to the figures in detail, FIGS. 1-3 provide perspective views of an example pin refacer 100. FIG. 1 is a perspective side view of the pin refacer, FIG. 2 is a perspective end view of the distal end of the pin refacer, and FIG. 3 is a perspective end view of the proximal end of the pin refacer. As used herein, a proximal direction may be defined as extending toward the end of the pin refacer 100 that extends away from the tubular connection when it is connected to the tubular connection, and a distal direction may be defined as extending toward the tubular connection when the pin refacer 100 is attached to the tubular connection. In some embodiments, the proximal direction may be defined as extending into the tubular connection and the distal direction may be defined as extending away from the end of the tubular connection.

The pin refacer 100 may comprise a mandrel 102 (see FIG. 2). The pin of the tubular connection may be inserted into the mandrel 102 (see FIGS. 4 and 5). A primary face plate 104 may be positioned in a distal direction or around the mandrel 102. The primary face plate 104 may include a proximal surface 106 and a distal surface 108. Primary face plate handles 110, cutter holders 112, an air-oil line 114 (see FIGS. 2 and 3) and line attachment tab 116 may extend from the distal surface 108. The air-oil line 114 may be part of the air-oil system and may have an open end facing the cutter holders 112 for dispensing compressed air and oil to the area during cutting.

The primary face plate handles 110 may be attached to the ends of shaft guides 118 affixed through the primary face plate 104 and torque-stop face plate 120. The shaft guides 118 may set the distance between the face plates 104, 120. Shaft guides 118 may beneficially have dimensions determined by the specifications of the tubular member being refaced in order to provide cutters to the shoulders of the tubular member at the specified dimensions of the shoulders. Additionally, cutters may be adjustably positionable to provide another level of adjustability and precision to the apparatus. A barrel 122 or aluminum housing may be disposed around the mandrel 102 and shaft guides 118. The barrel 122 may house the mandrel 102 with bearings 402 (see FIG. 4) permitting the mandrel 102 to rotate independent of the barrel 122. The torque-stop face plate 120 may bear cutter holders 124 extending from its distal face 126. A second air-oil line 128 may also be disposed passing through the torque-stop face plate 120 toward the cutter holders 124 to provide compressed air and oil to the cutting surfaces on the cutter holders 124.

Drive nut plate pins 130 may pass through and primarily extend proximally from the torque-stop face plate 120 and may connect to the drive nut plate 132. The distal ends of the drive nut plate pins 130 may be connected to the barrel 122. An engaging nut 134 may extend through the drive nut plate 132. The engaging nut 134 may rotate in place within the drive nut plate 132. The engaging nut 134 may have removable handles 136 screwed into threaded holes around the perimeter of the nut 134. The handles 136 may provide leverage for applying a torque to the engaging nut 134. Alternatively, the engaging nut 134 may have an outer surface configured to be turned by a wrench or other lever.

The engaging nut 134 may be in threaded connection with a threaded portion of a drive shaft 138. The drive nut plate 132 and pins 130 may keep the engaging nut 134 and torque-stop face plate 120 aligned with the drive shaft 138. The drive shaft 138 may extend through the engaging nut 134 and may connect to the torque-stop face plate 120. In some embodiments the drive shaft 138 may be welded to the torque-stop face plate 120. In other embodiments, the drive shaft 138 may be removably attached to the torque-stop face plate 120. The drive shaft 138 may provide rotational motion to the torque-stop face plate 120 and primary face plate 104 via the shaft guides 118. Thus, the drive shaft 138, face plates 104, 120, and shaft guides 118 may all be fixed in relation to each other when assembled. Likewise, the barrel 122, drive nut plate pins 130 and drive nut plate 132 may all be fixed in relation to each other. The mandrel 102 may rotate within the barrel 122, but does not translate longitudinally. Similarly, the engaging nut 134 may rotate within the drive nut plate 132 but does not translate longitudinally with respect to the plate. The movement of the engagement nut 134, however, may allow the positioning elements 122, 130, 132, 134 to translate longitudinally in relation to the drive shaft-connected elements 104, 118, 120, 138.

For example, when the drive shaft rotates 138, the drive shaft-connected elements 104, 118, 120 and positioning elements 122, 130, 132, 134 may also rotate at the same rate. Note that the positioning elements 122, 130, 132, 134 may rotate because of the pins 130 extending through the torque-stop face plate 120. The engaging nut 134 will tend to rotate as well, as it is driven by friction in the threaded drive shaft 138. If the engaging nut 134 is stopped from rotating, however, such as by an operator restraining one of the engaging nut handles 136, the engaging nut 134 may advance or retreat longitudinally along the drive shaft 138. This lateral movement may cause the drive shaft-connected elements 104, 118, 120, 138 to move laterally as well. For instance, when the engaging nut 134 retreats proximally, the drive shaft-connected elements may advance distally in relation to the engaging nut 134, and vice versa. In this manner, the engaging nut 134 may cause the cutters to engage the shoulders of a tubular connection when the refacing apparatus is connected to a tubular connection.

The drive shaft 138 may also include a drive nut 140, to which a drive unit may be attached. The drive nut 140 may be fixed to the drive shaft 138 so the drive shaft 138 may be rotated by turning the drive nut 140. In some embodiments, the drive nut 140 may have multiple faces on which a wrench or other drive system may be attachable. The drive shaft 138 may also comprise a handle 142 rotatable independent from the rest of the drive shaft 138. The handle 142 may allow a technician to hold the proximal end of the apparatus 100 while operating the handles 110 on the distal end so that when the mandrel 102 is loosened, the technician may have a stationary handhold for bearing the weight of the apparatus 100 even while the remainder of the apparatus 100 spins due to turning the face plates and mandrel 102.

In some embodiments, a locking pin 144 may be employed which may be removably inserted through the torque-stop face plate 120 and into the mandrel 102 to synchronize their rotation. Thus, when a wrench or other lever is attached to the torque-stop face plate 120 and applies a torque, the entire apparatus 100 will rotate together. This allows the mandrel 102 to be tightened onto the tubular connection before refacing or to be loosened after refacing.

An air-oil chuck 146 may be disposed at the proximal end of the drive shaft 138 to provide a point of connection for a source of compressed air mixed with a lubricant, such as an oil, to supply the air-oil lines 114, 128.

Figure 4:
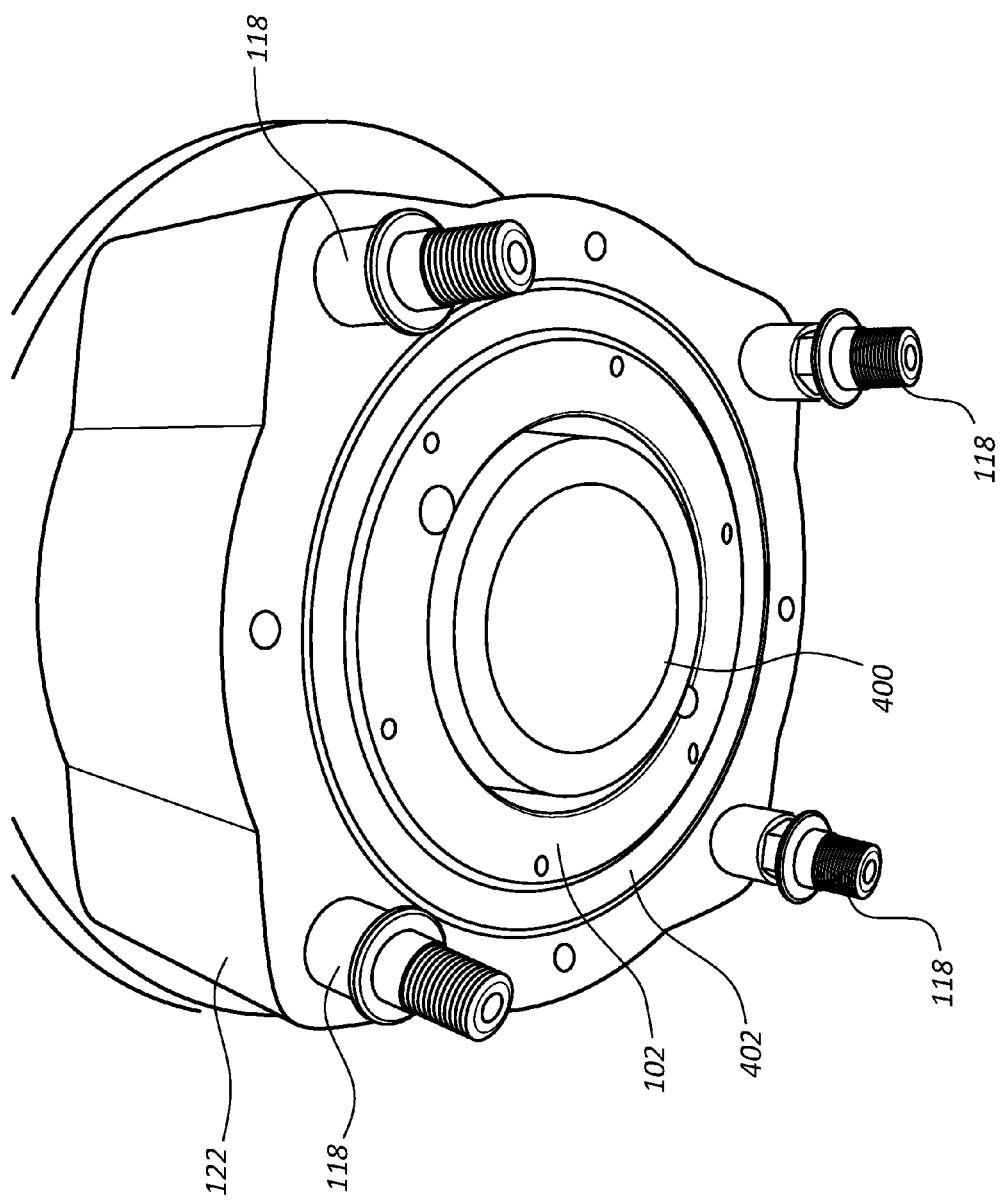
FIG. 4 is a perspective end view of a pin refacer with the refacer partially disassembled while attached to a pin of a tubular connection.

Referring now to FIG. 4, a perspective end view of a pin refacer is shown with the apparatus partially disassembled while attached to a pin 400 of a tubular member. The bearing 402 can be seen between the pin 400 and the barrel 122. The torque-stop face of the pin 400 has been refaced, including a refacing and a bevel of its outer edge. A pin 400 in this case may be defined as a narrowed portion at the end of the tubular member that has a distal face that is the torque-stop face of the pin 400 and a proximal face that is the primary face of the pin 400.

Figure 5:
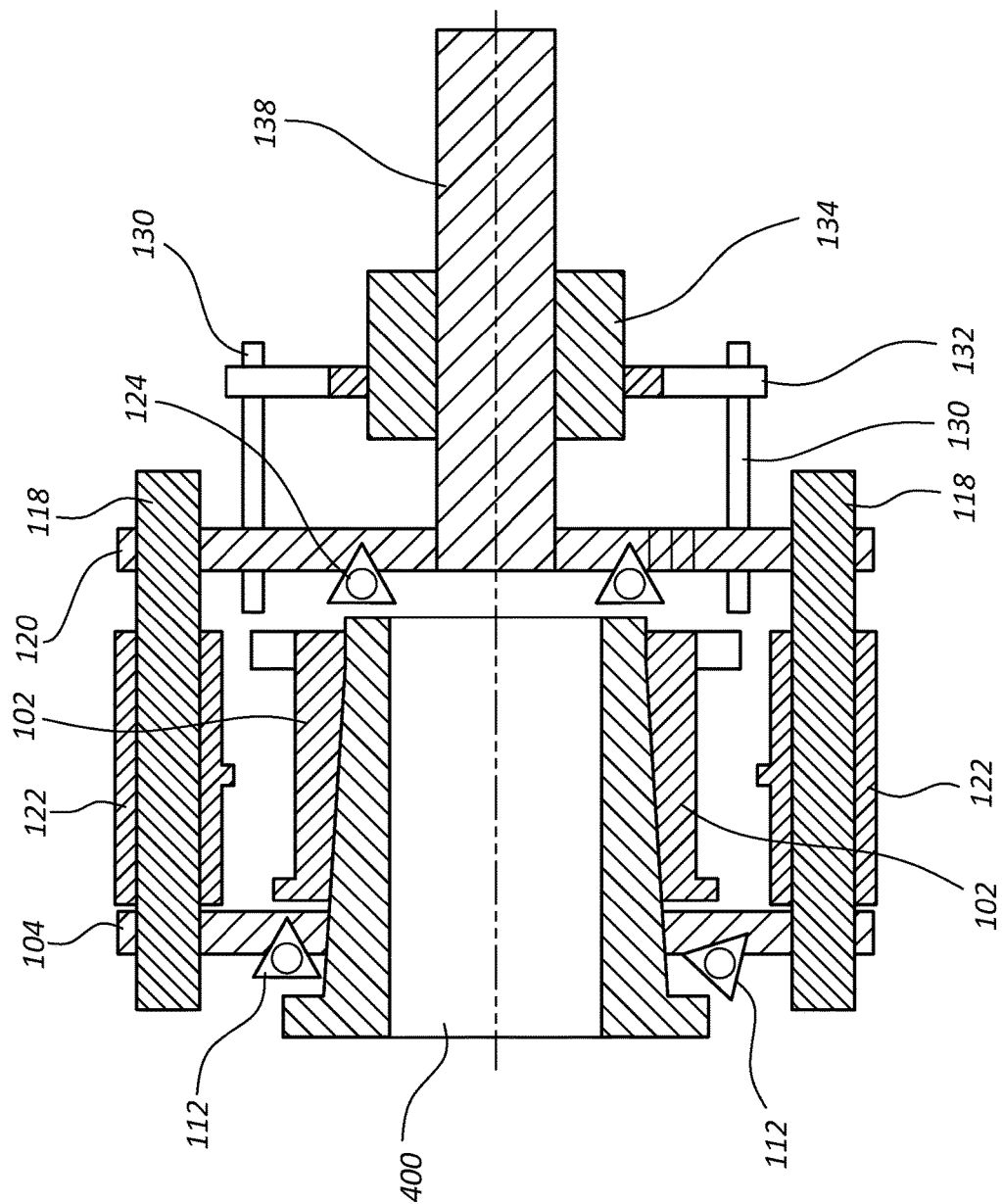
FIG. 5 is a partial central cross-sectional, side-oriented view of a pin refacer.

FIG. 5 is a partial central cross-sectional, side-oriented view of a pin refacer engaging a pin connection of a tubular member. The pin 400 may be refaced in this embodiment by face and bevel primary shoulder cutters 112 and a torque-stop face cutter 124 simultaneously. The bearing is not shown, but may be positioned between the barrel 122 and the mandrel 102. See bearing 402 in FIG. 4. The drive nut plate pins 130 are shown with lines indicating their connection to the barrel 122. Primary face plate handles (110 in FIG. 2), engaging nut handles (136 in FIG. 1), the drive nut (140 in FIG. 1), the air-oil system elements, and other features are not shown in this view.

Figure 6B:
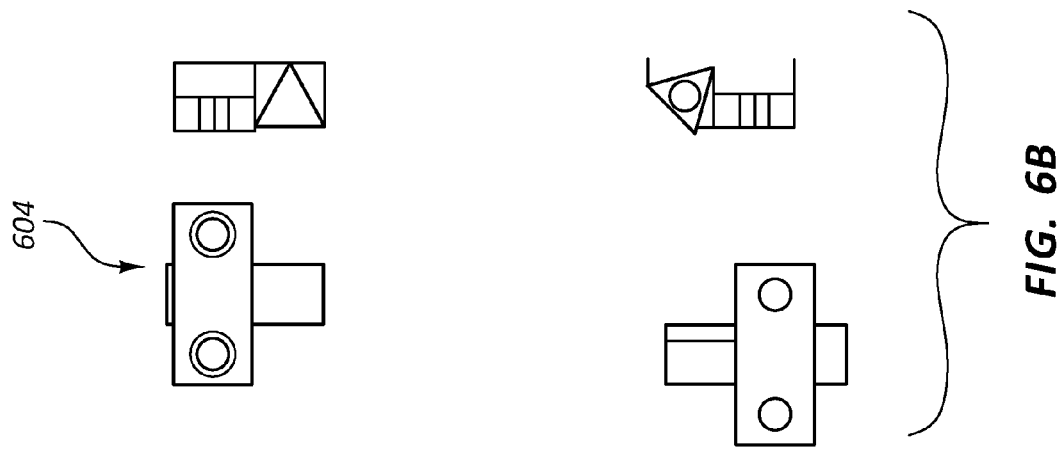
FIG. 6B shows various cutter elements that may be used with a face plate of a refacer.
Figure 6A:
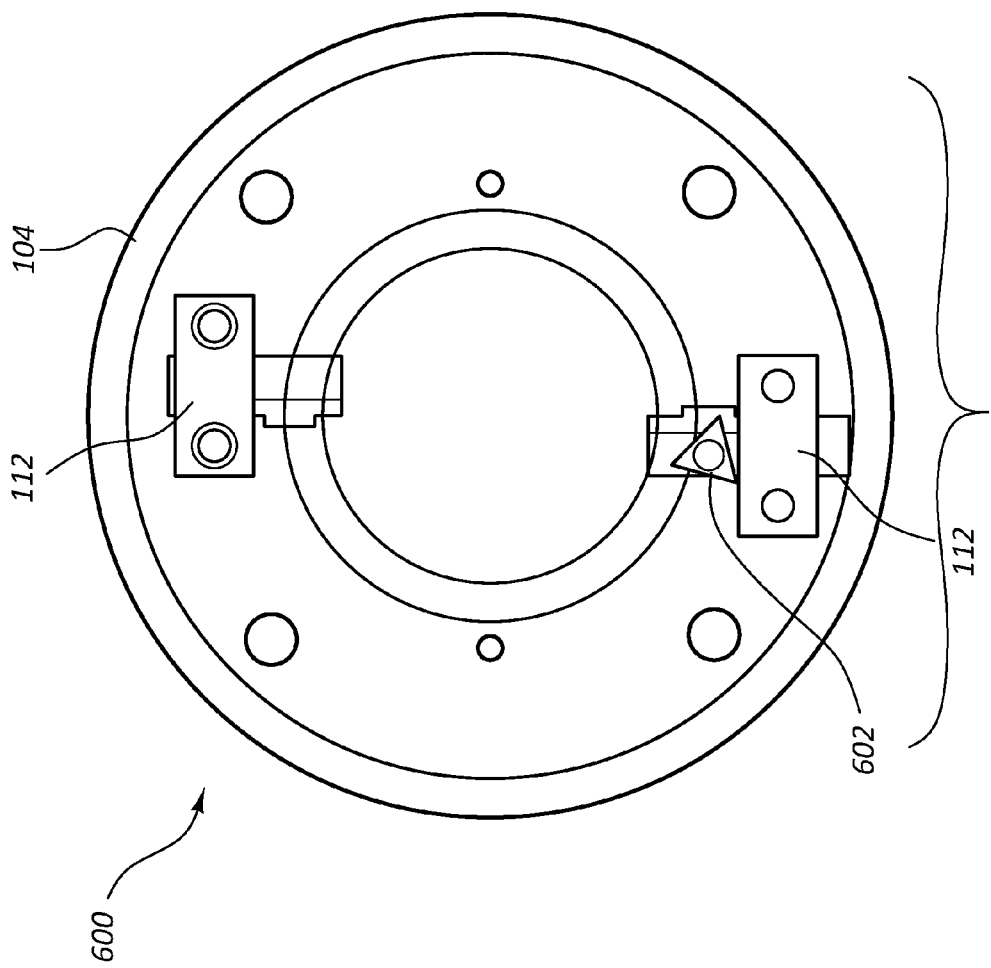
FIG. 6A is an end view of a primary face plate of a pin refacer.

FIG. 6A shows an end view 600 of a primary face plate 104 of a pin refacer having two cutter holders 112 and one cutter 602 installed. Various cutter elements 604 are shown in FIG. 6B, illustrating other embodiments of cutters and cutter holders separated from the face plate 104. Cutters and cutter holders may be configured for planar or beveled cutting, wherein a planar cutter may cut a face of a tubular connection to be planar, and a bevel cutter may cut an edge of a tubular connection to be beveled.

Figure 7B:
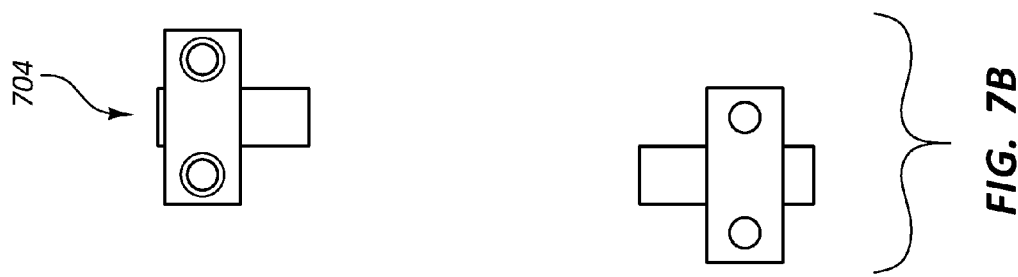
FIG. 7B shows example cutter elements that may be used with a face plate of a refacer.
Figure 7A:
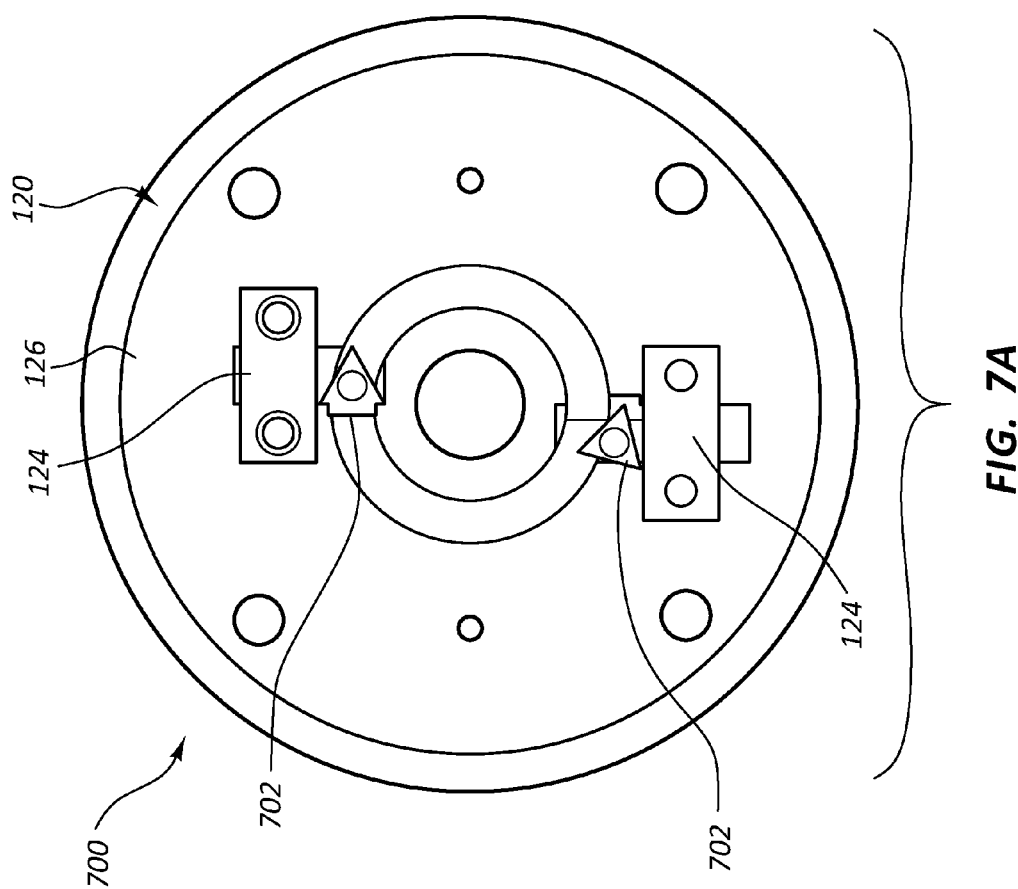
FIG. 7A is an end view of a torque-stop face plate of a pin refacer.

FIG. 7A shows an end view 700 of a torque-stop face plate 120 of a pin refacer having two cutter holders 124 and two cutters installed. Other cutter elements 704 are also shown in FIG. 7B showing other embodiments of cutters and cutter holders separated from a face plate 120.

Figure 8:
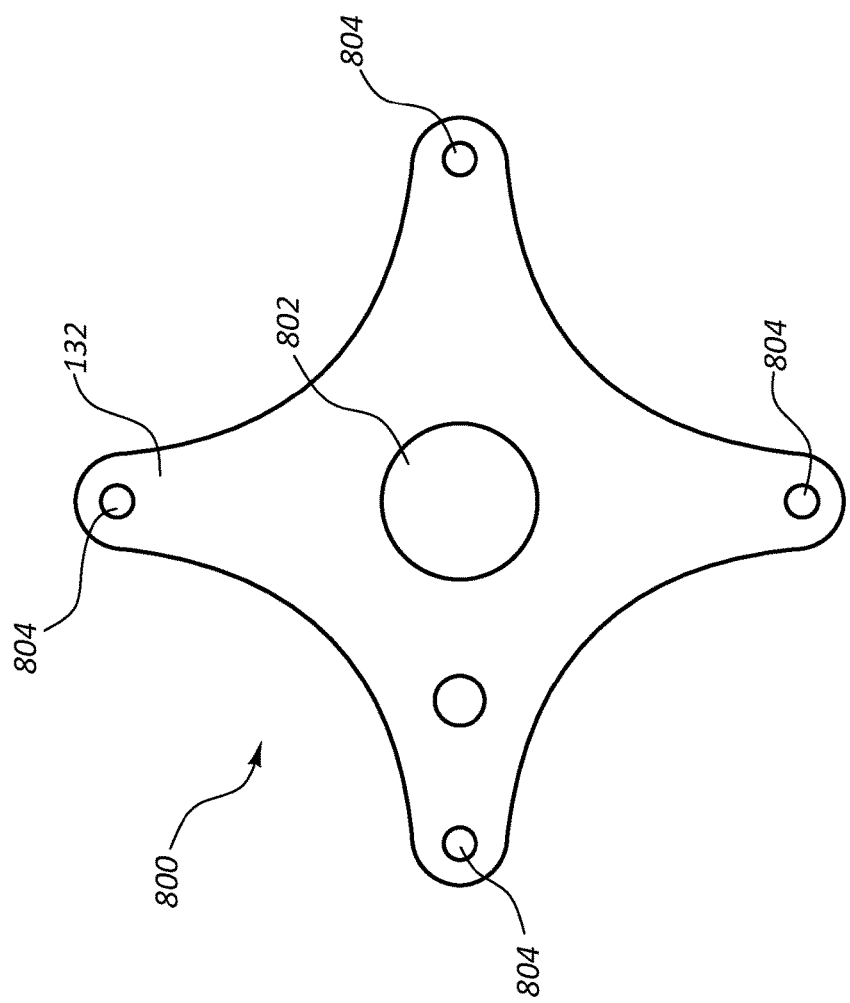
FIG. 8 is an end view of a drive nut plate of a pin refacer.

FIG. 8 shows an end view 800 of a drive nut plate 132 of a pin refacer. An engaging nut 134 may be positioned within the central aperture 802, and peripherally-located drive nut pins (130 in FIG. 1) may be positioned within the peripherally-located apertures 804. The peripherally-located apertures 804 may be threaded to secure the drive nut pins 130.

Figure 9:
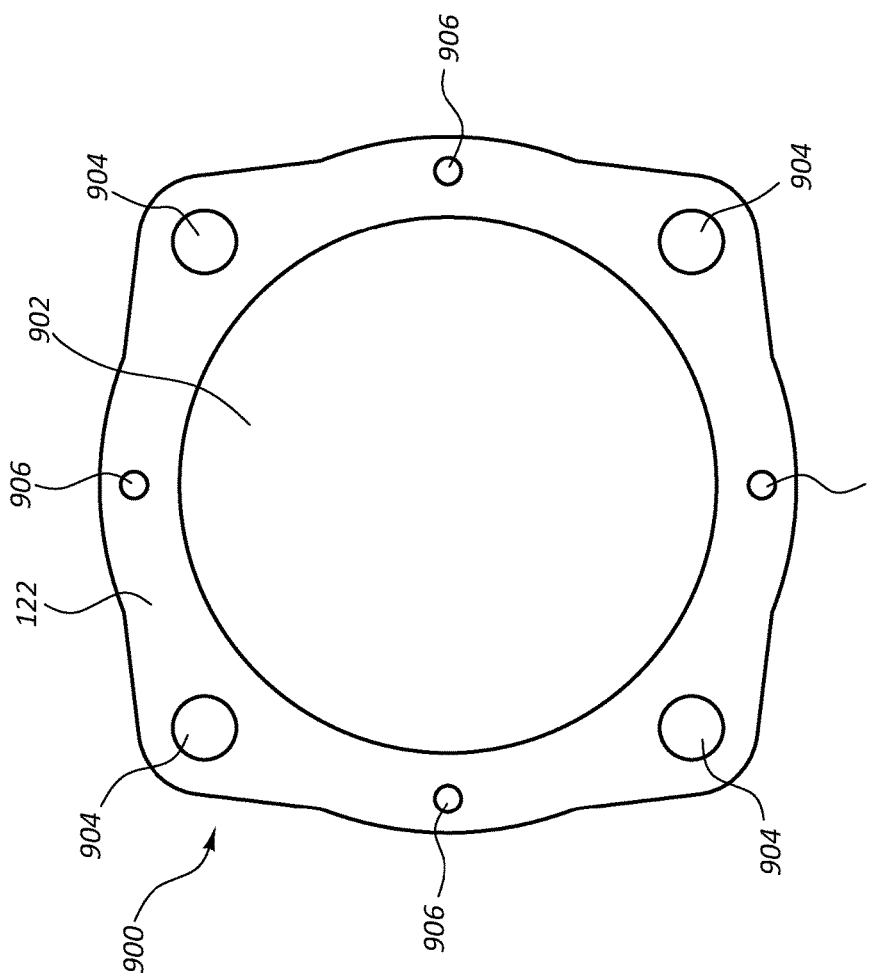
FIG. 9 is an end view of a barrel of a pin refacer.

FIG. 9 shows an end view 900 of a barrel 122 of a pin refacer. A bearing (402 in FIG. 4) and mandrel (102 in FIG. 5) may be positioned within the central aperture 902, shaft guides (118 in FIG. 1) may be positioned within the large peripheral apertures 904, and drive nut pins (130 in FIG. 1) may be positioned within or attached to the small peripheral apertures 906. The small peripheral apertures 906 may be threaded to secure the drive nut pins (130 in FIG. 1). The sizes of the peripheral apertures 904, 906 are described here as relative to each other in view of the embodiment shown, but in other embodiments their sizes may be changed in relation to each other. For example, the small peripheral apertures 906 may be larger than the large peripheral apertures 904 in some embodiments.

Figure 10:
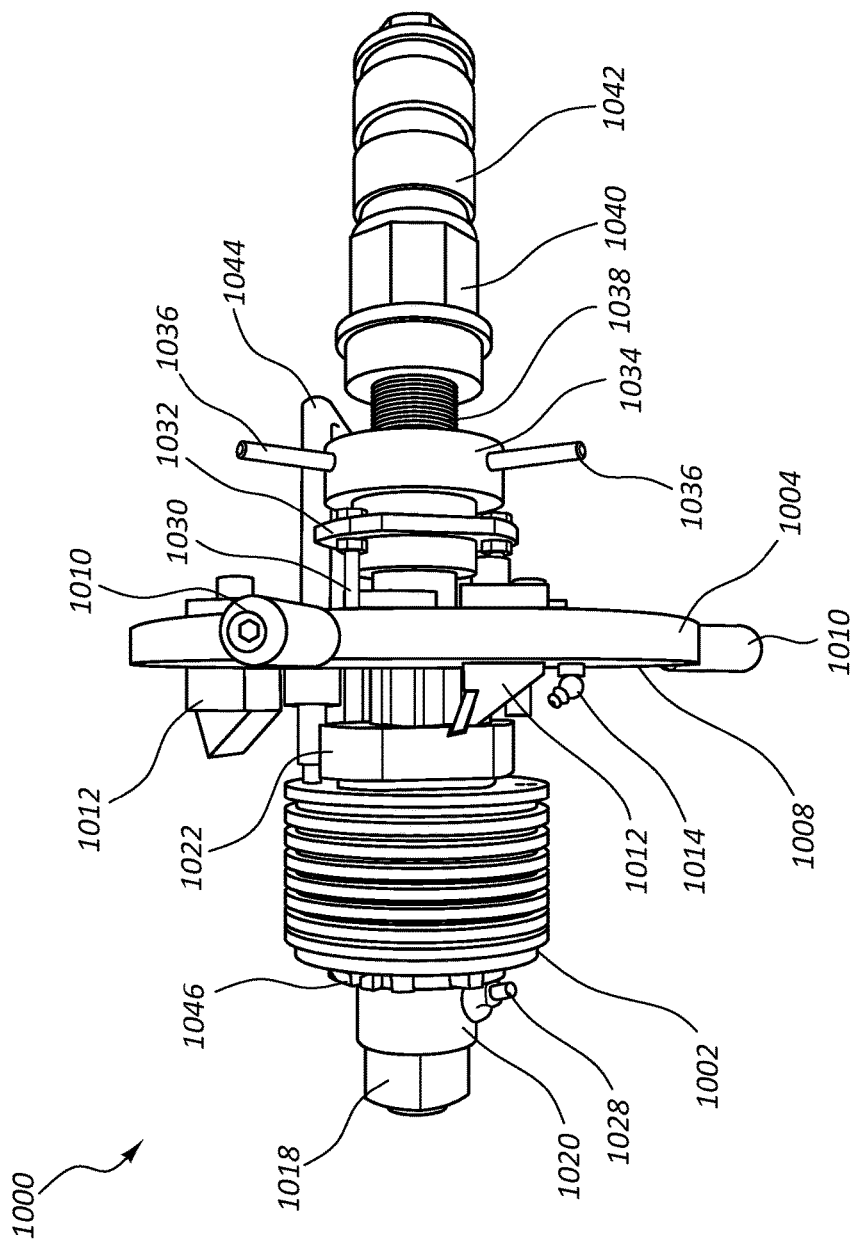
FIG. 10 is a perspective side view of a box refacer.
Figure 11:
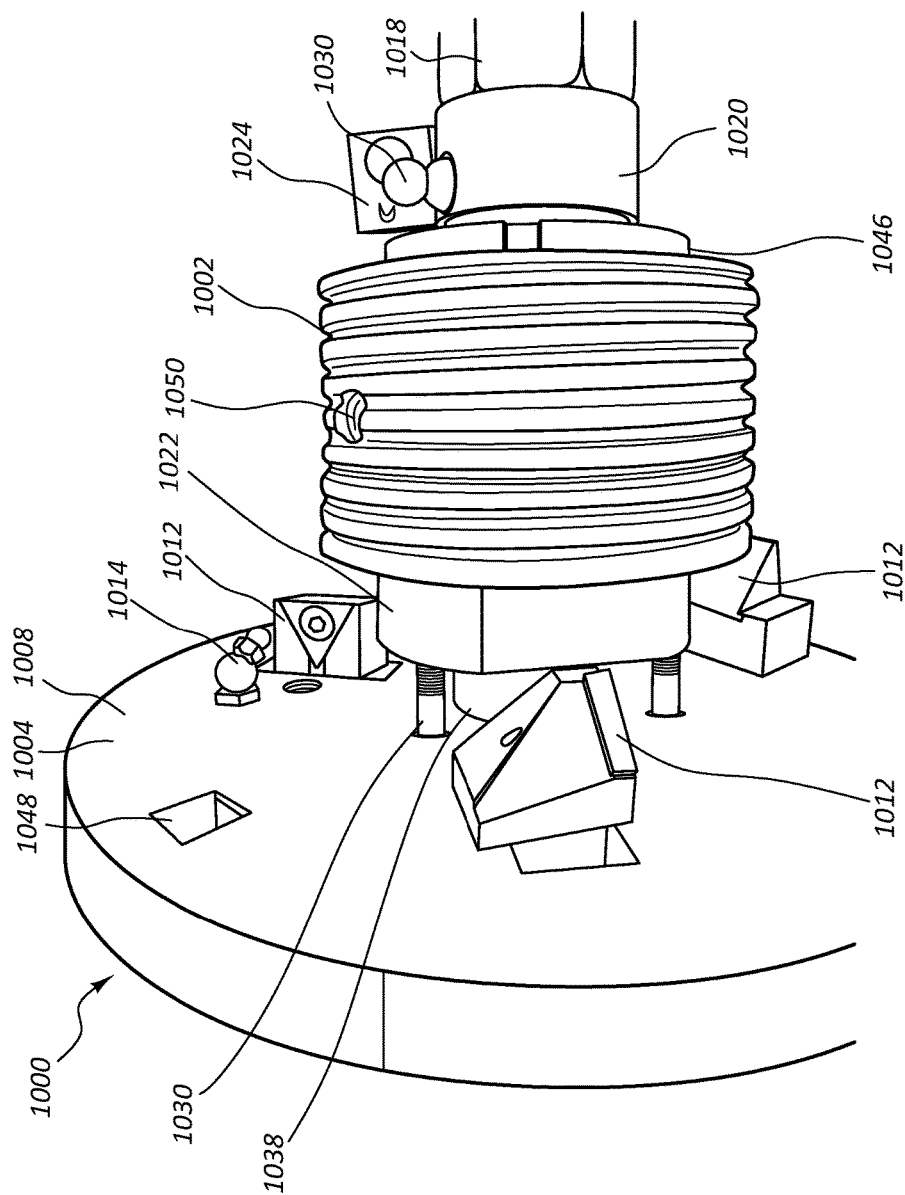
FIG. 11 is another perspective side view of a box refacer.
Figure 12:
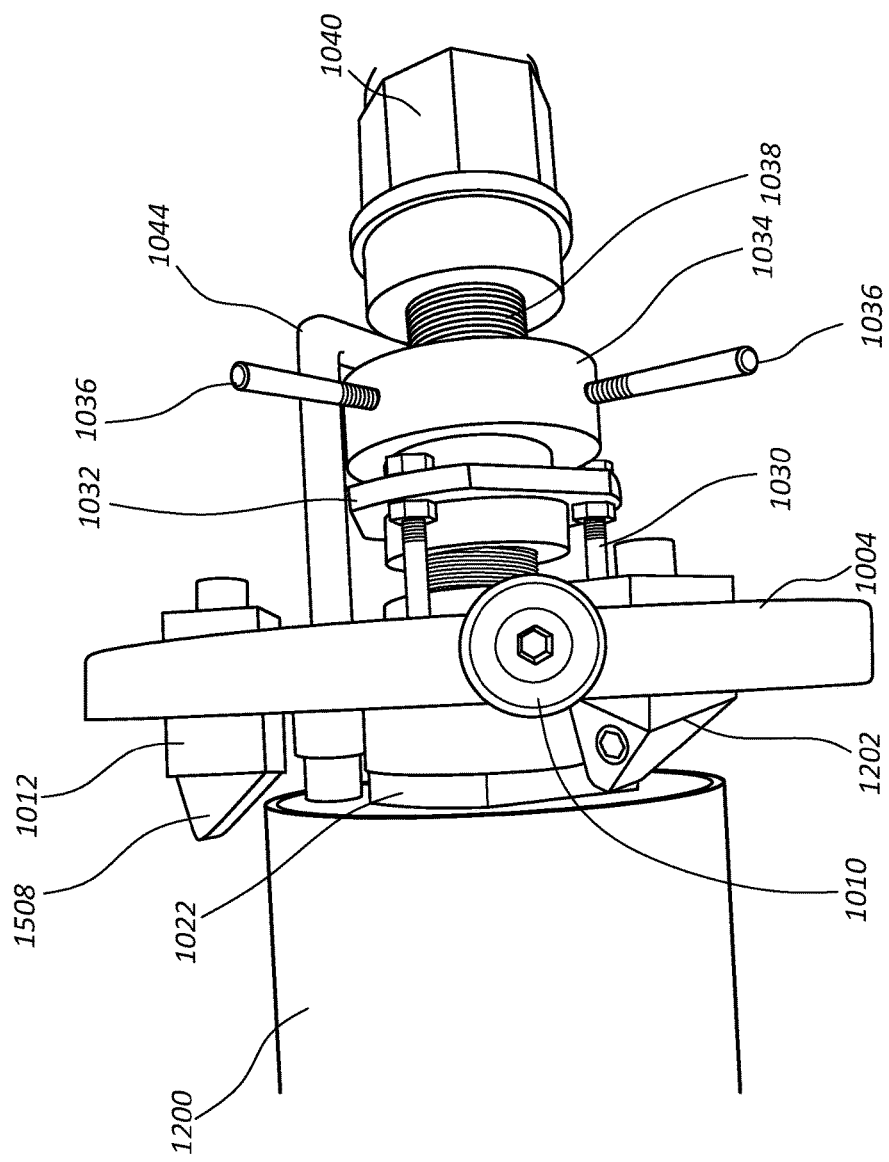
FIG. 12 is a perspective side view of a box refacer being used to reface a tubular connection.
Figure 13:
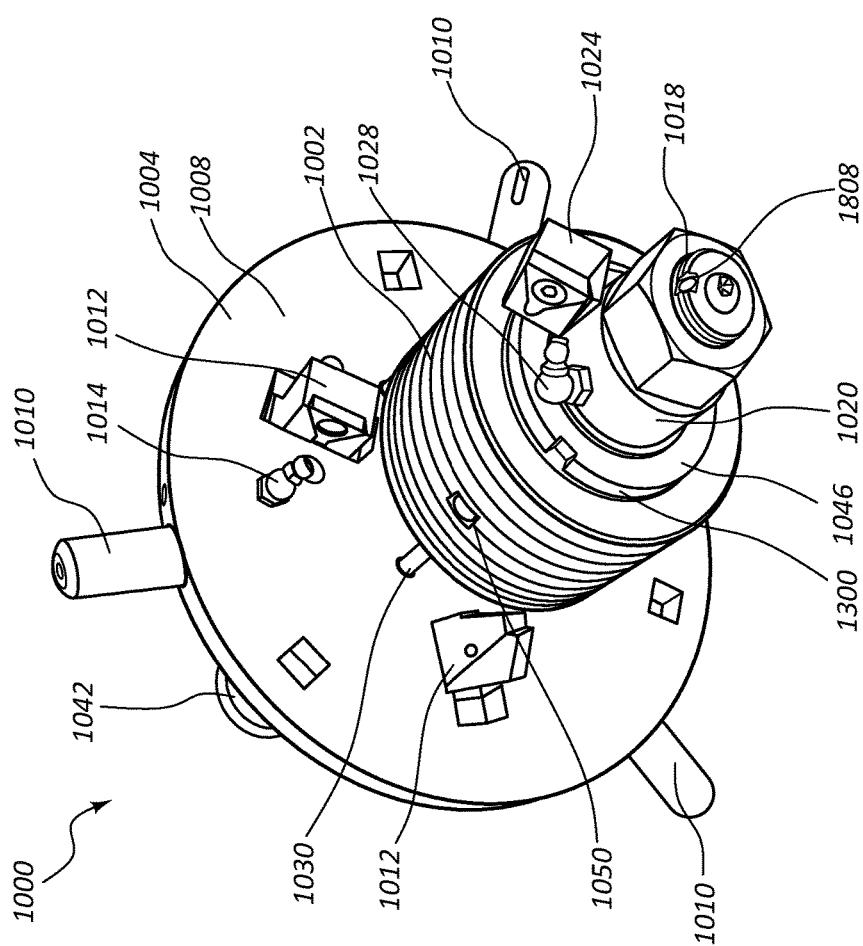
FIG. 13 is a perspective end view of the distal end of a box refacer.

FIGS. 10-13 provide perspective views of an example box refacer 1000. FIG. 10 is a perspective side view of the box refacer 1000; FIG. 11 is a close-up perspective side view of the distal end of the box refacer 1000; FIG. 12 is a perspective side view of the box refacer 1000 refacing a tubular member; and FIG. 13 is a perspective end view of the distal end of the box refacer. The box refacer 1000 may comprise a mandrel 1002. A primary face plate 1004 may be positioned in a proximal direction from the mandrel 1002. The primary face plate 1004 may include a distal surface 1008 and proximal surface (not shown; opposite the distal surface 1008). Primary face plate handles 1010, cutter holders 1012, and air-oil nozzle 1014 may extend from the distal surface 1008. The air-oil nozzles 1014 may be part of the air-oil system and may have an open end facing the cutter holders 1012 for dispensing compressed air and oil to the area during cutting.

The primary face plate 1004 may be attached to a drive shaft 1038. A torque-stop face plate 1020 may also be attached to the drive shaft 1038. The torque-stop face plate 1020 may have a cutter holder 1024 (see FIG. 13) and an air-oil nozzle 1028 for providing compressed air and oil to the cutting surfaces on the cutter holder 1024. The cutter holder 1024 and air-oil nozzle 1028 may extend radially from the torque-stop face plate 1020.

The attachment of the face plates 1004, 1020 to the drive shaft 1038 may set the distance between the cutter holders 1012, 1024. A barrel 1022 may be disposed within the mandrel 1002, with bearings (not shown) between the barrel 1022 and the mandrel 1002 allowing the mandrel 1002 to rotate independent of the barrel 1022. A bearing seal 1300 (see FIG. 13) and locking nut 1046 secure the bearings in place, tightly in one embodiment with a minimum amount of slop in order to maintain tight tolerances of the cutters. In the embodiment shown in FIG. 13, a hole 1050 is provided in the side of the mandrel 1002 to provide oil for the bearings disposed therein.

Drive nut plate pins 1030 may pass through the primary face plate 1004 and connect to the drive nut plate 1032 (see FIG. 10). The distal ends of the drive nut plate pins 1030 may be connected to the barrel 1022. An engaging nut 1034 may extend through the drive nut plate 1032. The engaging nut 1034 may rotate in place within the drive nut plate 1032. The engaging nut 1034 may have removable handles 1036 screwed into threaded holes around the perimeter of the engaging nut 1034. The handles 1036 may provide leverage for applying a torque to the engaging nut 1034.

The engaging nut 1034 may be in threaded connection with a threaded portion of a drive shaft 1038. The drive shaft 1038 may extend through the engaging nut 1034 and connect to the primary face plate 1004 and torque-stop face plate 1020. In some embodiments the drive shaft 1038 may be welded to the torque-stop face plate 1020 and the primary face plate 1004. In other embodiments, the drive shaft 1038 may be removably attached to the face plates 1004, 1020. For example, the torque-stop face plate 1020 may be secured to the end of the drive shaft 1038 by a face plate nut 1018. Additionally, the torque-stop face plate 1020 may be further secured to the drive shaft 1038 by a longitudinal groove 1808 (see FIG. 13) that receives a longitudinal tongue or bolt (not shown) on a drive shaft-facing portion of the face plate 1020. The drive shaft 1038 may provide rotational motion to the torque-stop face plate 1020 and primary face plate 1004. Thus, the drive shaft 1038 and face plates 1004, 1020 may all be fixed in relation to each other when assembled.

Likewise, the barrel 1022, drive nut plate pins 1030 and drive nut plate 1032 may all be fixed in relation to each other. The mandrel 1002 may rotate around the barrel 1022, but does not translate longitudinally relative to the barrel 1022. Similarly, the engaging nut 1034 may rotate within the drive nut plate 1032 without translating longitudinally with respect to the plate. The movement of the engagement nut 1034, however, may allow the positioning elements 1022, 1030, 1032, 1034 to simultaneously translate longitudinally in relation to the drive shaft 1038 and the drive shaft-connected elements 1004, 1020. This causes the cutters to move longitudinally relative to the mandrel 1002 and thus move closer to or farther from the work piece surface(s) to be refaced.

For example, once the tool is secured in place—i.e., once the mandrel 1002 engages the threads of the box to be refaced—the drive shaft 1038 may rotate, thereby driving rotation of the drive shaft-connected elements 1004, 1020, 1038 at the same rate. Note that the positioning elements 1022, 1030, 1032, 1034 may also rotate because of the pins 1030 extending through the primary face plate 1004. The engaging nut 1034 will tend to rotate as well, as it is driven by friction in the threaded drive shaft 1038. If the engaging nut 1034 is stopped from rotating, however, such as by an operator restraining one of the engaging nut handles 1036, the engaging nut 1034 may advance or retreat (i.e., travel) longitudinally along the drive shaft 1038 (see also FIG. 14 and its related description below). This lateral movement may cause the drive shaft-connected elements 1004, 1020 to move laterally as well. For instance, when the engaging nut 1034 retreats proximally, the drive shaft-connected elements may advance distally in relation to the nut 1034, and vice versa. In this manner, the engaging nut 1034 may cause the cutters to engage the shoulders of a tubular connection when the refacing apparatus is connected to a tubular connection.

Figure 14:
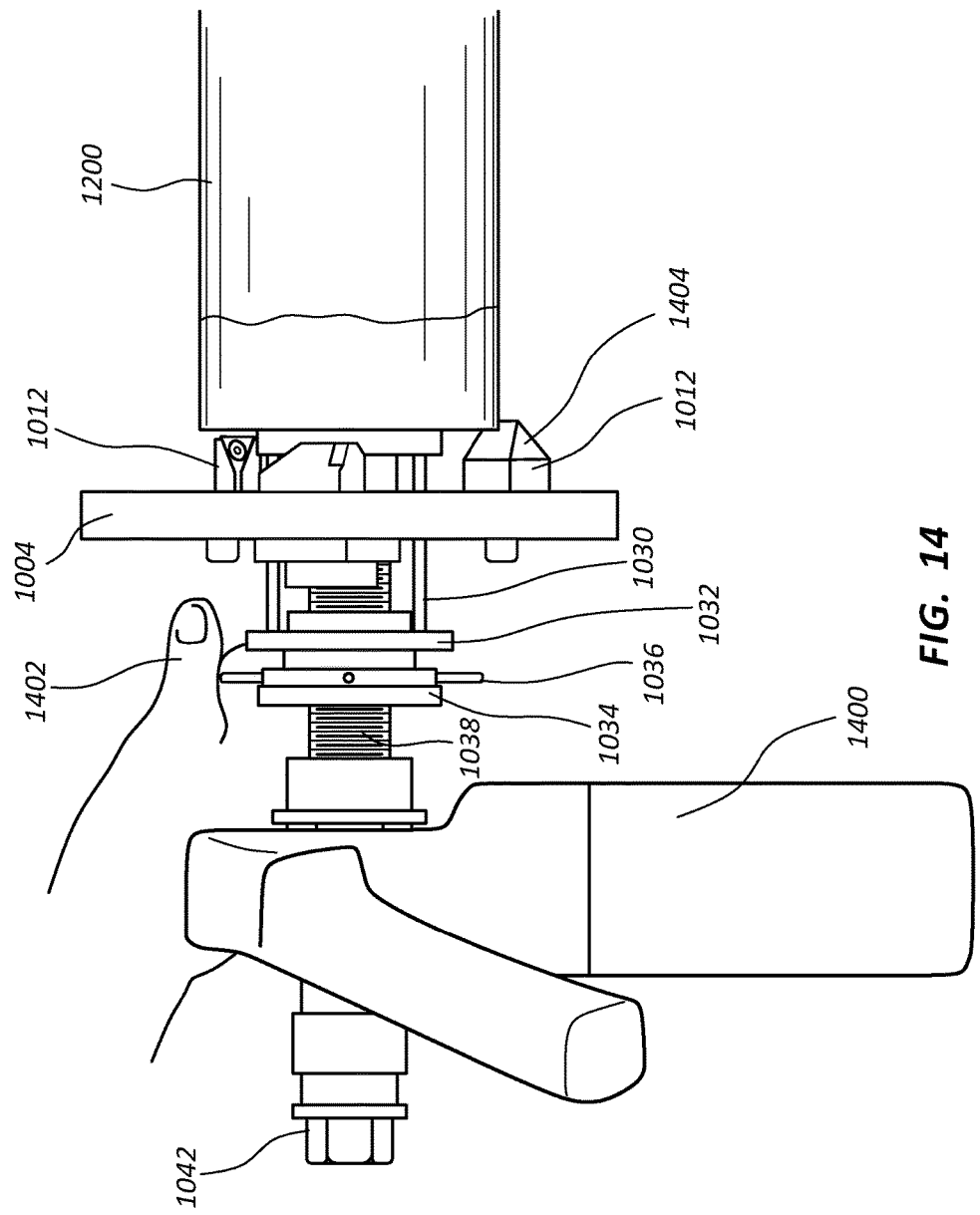
FIG. 14 is a side view of a box refacer engaging a box connection of a tubular member.

The drive shaft 1038 may also include a drive nut 1040, to which a drive unit may be attached (see FIG. 14). The drive nut 1040 may be fixed to the drive shaft 1038 so the drive shaft 1038 may be rotated by turning the drive nut 1040. In some embodiments, the drive nut 1040 has multiple faces on which a wrench or other drive system may be attachable. The drive shaft 1038 may also have a handle 1042 rotatable independent from the rest of the drive shaft 1038. The handle 1042 may allow a technician to hold the proximal end of the apparatus 1000 while operating the handles 1010 on the primary face plate 1004 so that when the mandrel 1002 is loosened, the technician may have a stationary handhold for bearing the weight of the apparatus 1000 even while the remainder of the apparatus 1000 spins due to turning the face plates and mandrel 1002.

In some embodiments, a locking pin 1044 may be employed which can be removably inserted through the primary face plate 1004 and into an end of the mandrel 1002 to synchronize their rotation. This is used, for example, to engage the mandrel 1002 with the threads of the box to be refaced. Without the locking pin 1044, the primary face plate 1004 may rotate relative to the longitudinal axis of the tool, which may make it difficult to thread the mandrel 1002 into the box threads enough. Thus, with the locking pin 1044 in place, a wrench or other lever may be attached to the primary face plate 1004 and a torque may be applied to the primary face plate 1004, such as by a wrench, handle, or other tool attached to a wrench aperture 1048 (see FIG. 11), the entire apparatus 1000 may rotate together. This may allow the mandrel 1002 to be tightened onto the tubular connection before refacing or to be loosened after refacing.

An air-oil chuck (not shown) may be disposed at the proximal end of the drive shaft 1038 to provide a point of connection for a source of compressed air mixed with a lubricant such as an oil to supply the air-oil nozzles 1014, 1028.

Referring to FIG. 12 in particular, a side perspective view of a box refacer shows the refacer inserted into a box connection of a tubular member 1200. A cutter holder 1202 is shown engaging a primary shoulder of the box connection 1200. The box refacer is not operable to reface the tubular member 1200 in this view because the locking pin 1044 is locking the motion of the primary face plate 1004 to the mandrel 1002 which is within the tubular connection around the barrel 1022.

FIG. 14 shows a side view of a box refacer engaging a box connection of a tubular member 1200. A drive unit 1400 is attached to the drive nut 1040 of the drive shaft 1038. An operator 1402 is holding a handle 1036 of the engaging nut 1034 to advance or retreat the cutter holders 1012 along the drive shaft 1038 in order to engage or disengage the surface to be refaced, as the drive shaft 1038 turns. One of the cutters 1404 is a bevel cutter in this figure, as shown by its orientation cutting a bevel on the edge of the primary face of the box connection 1200.

Figure 15:
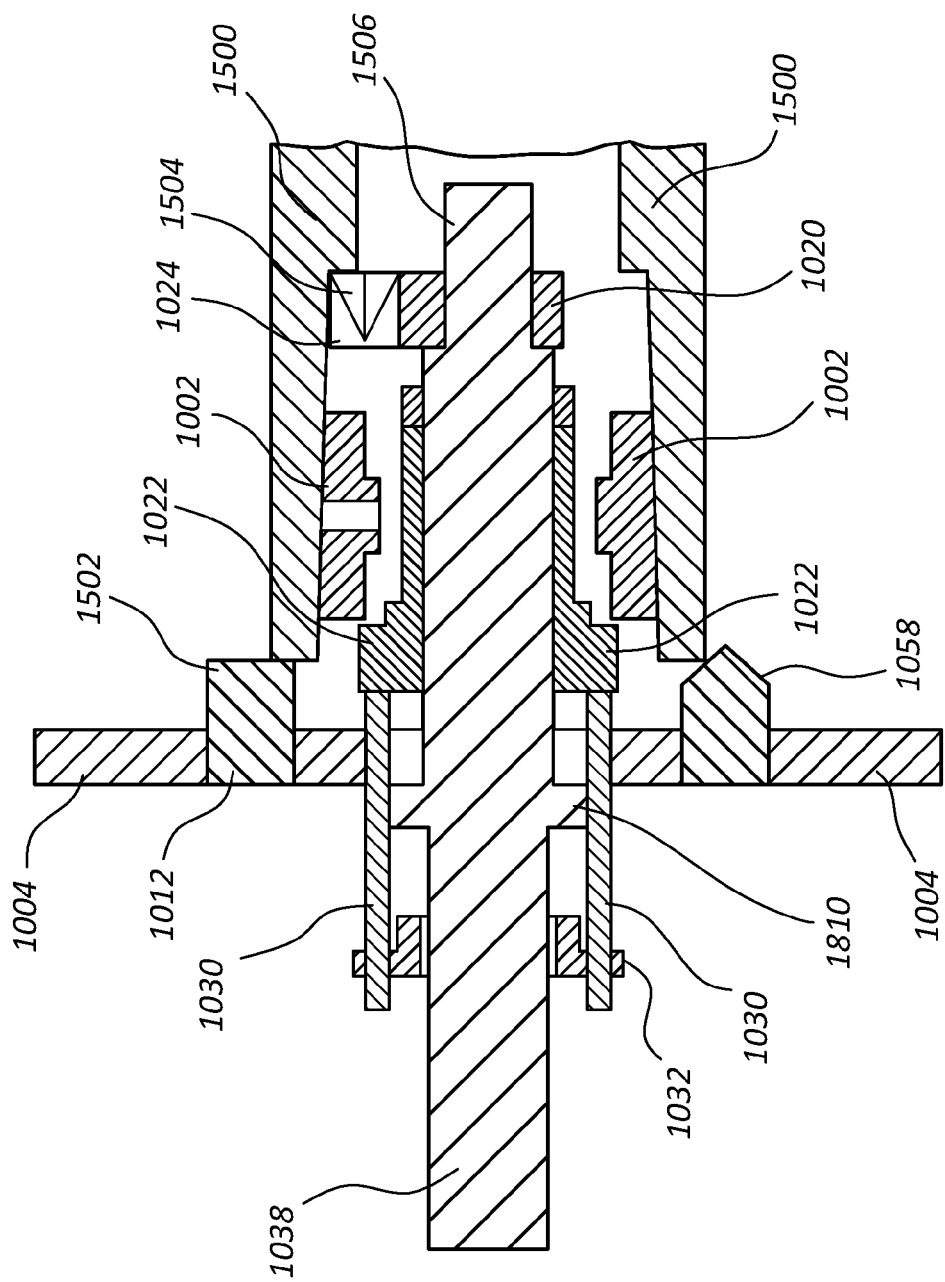
FIG. 15 is a partial central cross-sectional, side-oriented view of a box refacer engaging a box connection of a tubular member.

FIG. 15 shows a partial central cross-sectional, side-oriented view of a box refacer engaging a box connection 1500 of a tubular member. The box connection 1500 may be refaced in this embodiment by a primary cutter held by a cutter holder 1502, a torque-stop face cutter 1504, and a bevel cutter 1058 simultaneously. The bearings for the mandrel 1002 are not shown, but would be positioned between the barrel 1022 and the mandrel 1002. The cutter holder 1502 may be fitted with a bevel cutter (see, e.g., bevel cutter 1508 in FIG. 12) or a planar face cutter. Primary face plate handles 1010, the engaging nut 1034, the drive nut 1040, the locking nut 1046, and the air-oil system elements (see FIG. 10) are not shown in this view. A threaded portion 1506 of the drive shaft 1038 is shown, but the face plate nut 1018 is not installed.

Figure 16:
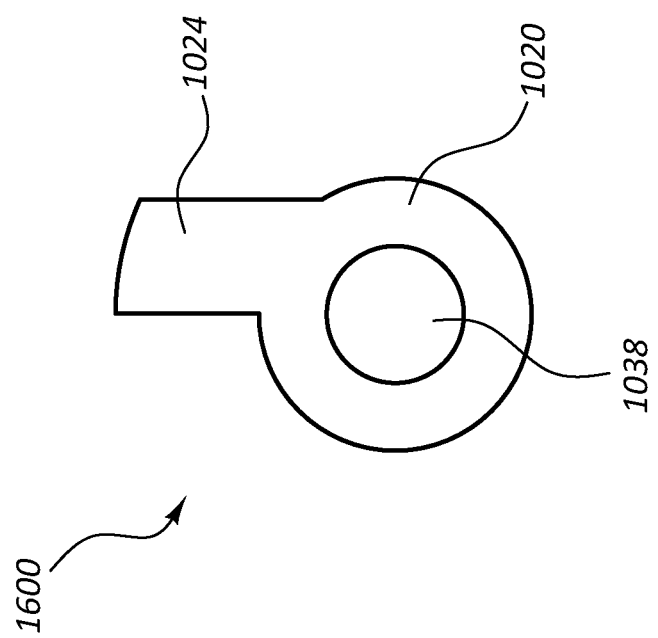
FIG. 16 is an end view of a torque-stop face plate of a box refacer installed on a drive shaft.

FIG. 16 shows an end view 1600 of a torque-stop face plate 1020 of the box refacer of FIG. 15 installed on the drive shaft 1038 showing a cutter holder 1024.

FIG. 17A shows an end view 1702 and FIG. 17B shows a side view 1700 of primary face plates 1004 of the box refacer of FIG. 15. The primary face plate 1004 bears multiple cutter holders 1704, 1706 having cutters 1708. The presence of both a bevel cutter holder 1704 and a face cutter holder 1706 on the face plate 1004 may enable simultaneous refacing of multiple surfaces and/or edges of the tubular member 1500. In one embodiment, first and second sets of cutters and/or cutter holders on the torque-stop face plate and on the primary face plate may be spaced at a precise, fixed distance such that the distance between the refaced surfaces remains the same as material is removed from the surfaces during refacing.

Figure 18:
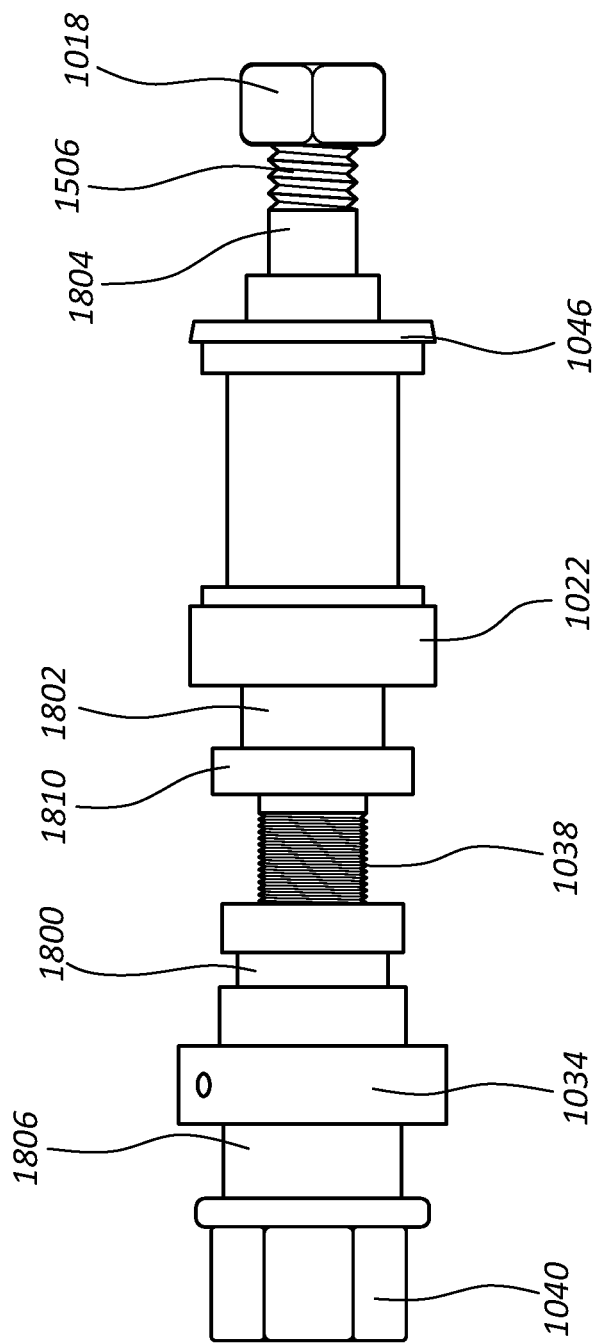
FIG. 18 is a side view of a drive system of the box refacer.

FIG. 18 shows a side view of a drive system disassembled from a box refacer, such as the box refacer 1000 of FIG. 10. The drive nut 1040 may be attached proximal to the threaded portion of the drive shaft 1038. The engaging nut 1034 may be threaded to the drive shaft 1038 and is shown without being connected to the drive nut plate 1032 (not shown). The drive nut plate 1032 could fit within the engaging nut groove 1800. Thus, it can be seen in this view that the engaging nut 1034 may move axially along the threaded portion of the drive shaft 1038 when turned.

A barrel 1022 may be located distally from the engaging nut 1034. The barrel 1022 is not covered by the mandrel 1002 or bearing 1300 in this figure, but is shown with the locking nut 1046 positioned at its distal end. The threaded portion 1506 of the distal end of the drive shaft is shown exposed, with the face plate nut 1018 loosened. The primary face plate 1004 (not shown) is attachable to a primary face plate attachment portion 1802 of the drive shaft. The torque-stop face plate 1020 (not shown) is attachable to a torque-stop face plate attachment portion 1804. The torque-stop face plate attachment portion may include a longitudinal groove 1808 (see FIG. 13) for receiving the torque-stop face plate and facilitating its rotation by the drive shaft 1038.

At the proximal end of the drive shaft 1038, a stop plate 1806 may be positioned between the drive nut 1040 and engaging nut 1034 and may keep the engaging nut 1034 separated from a drive unit (not shown) attached to the drive nut 1040. An attachment plate 1810 may also be integrated into the drive shaft 1038. The attachment plate 1810 may be an integral part of the drive shaft 1038 or welded to or threaded to the shaft 1038. The attachment plate 1038 may facilitate connection between the drive shaft 1038 and the primary face plate 1004 (not shown). For example, screws or other fasteners may be positioned to connect the attachment plate 1810 to the primary face plate 1004, thereby affixing the primary face plate at the primary face plate attachment portion 1802.

Figure 19:
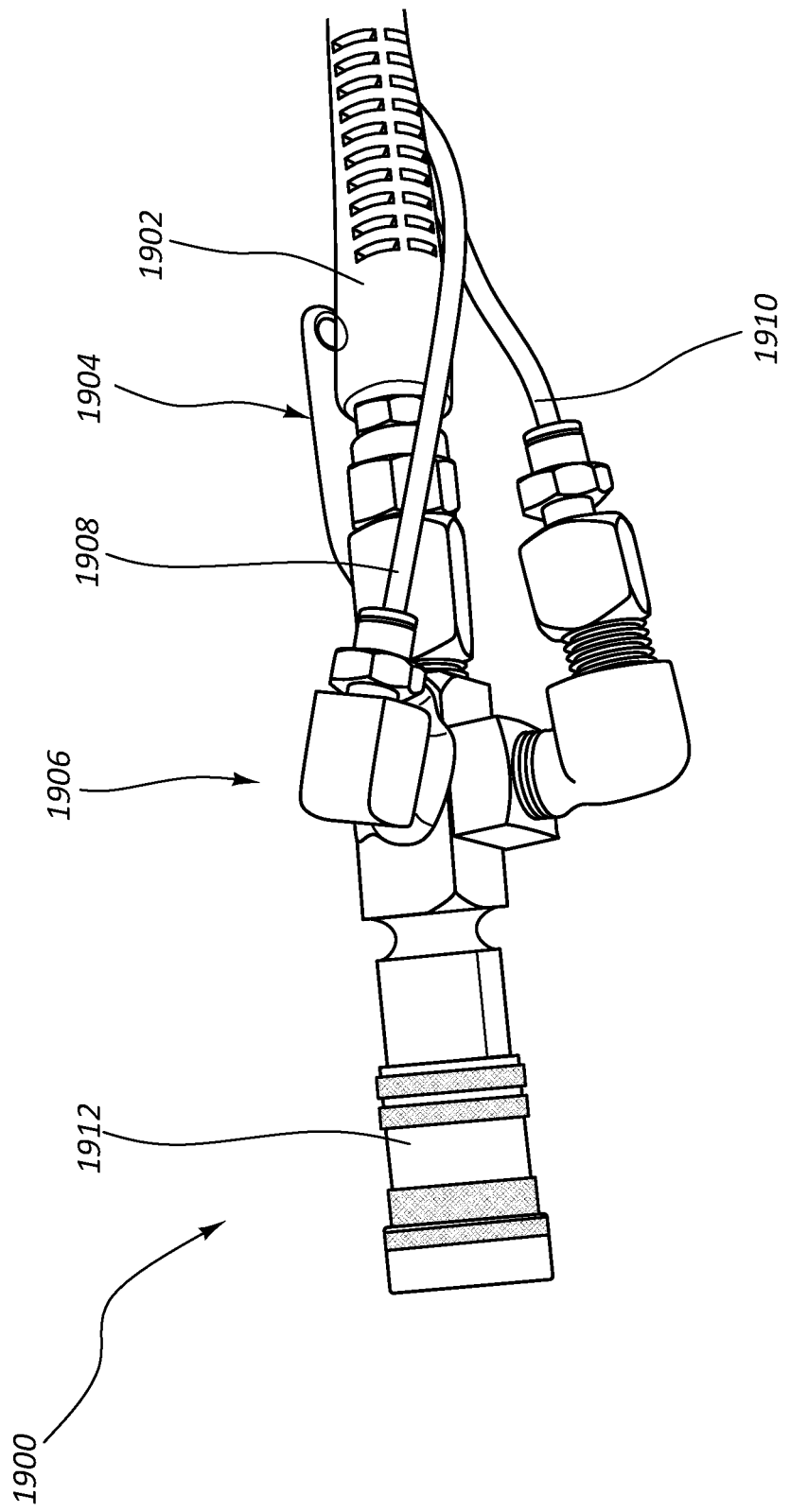
FIG. 19 is a perspective top view of an air-oil attachment interface.

FIG. 19 shows a top perspective view of an air-oil attachment interface 1900 that may be used to provide compressed air and oil to (or as part of) a refacing apparatus. An air supply line 1902 may provide a connection between a source of compressed air (not shown) and an air valve 1904. The air valve 1904 may control the flow of the compressed air to a mixing interface 1906. The mixing interface 1906 may receive and mix air from the air supply line 1902 and an air pilot line 1908 and oil or another appropriate lubricant from an oil line 1910. The mixed air and oil may then proceed to the air chuck connector 1912 to exit the interface 1900 and enter the refacing apparatus via an air-oil chuck (e.g., air-oil chuck 146 of FIG. 1). The mixing interface 1906 may provide a mixture of atomized lubricant and air supply such that the lubricant may be carried by the air flow to be sprayed onto a cutting surface in the refacing apparatus. The air chuck connector 1912 may be advantageously designed as a standard air-chuck attachment interface to decrease cost of parts by using existing equipment. Advantageously, the chuck connector 1912 may be removably attachable to the air-oil chuck on the refacing apparatus. The air-oil attachment interface 1900 may be configured to connect to a pin refacer or a box refacer and may accommodate multiple levels of air pressure and different types of lubricants based on the needs of the tubular connection being serviced, the cutters of the refacing apparatus, and conditions at the site of the tubular connection. In some embodiments, the air valve 1904 may be used to control the pressure output of the air supply line 1902 to the mixing interface 1906.

Figure 20:
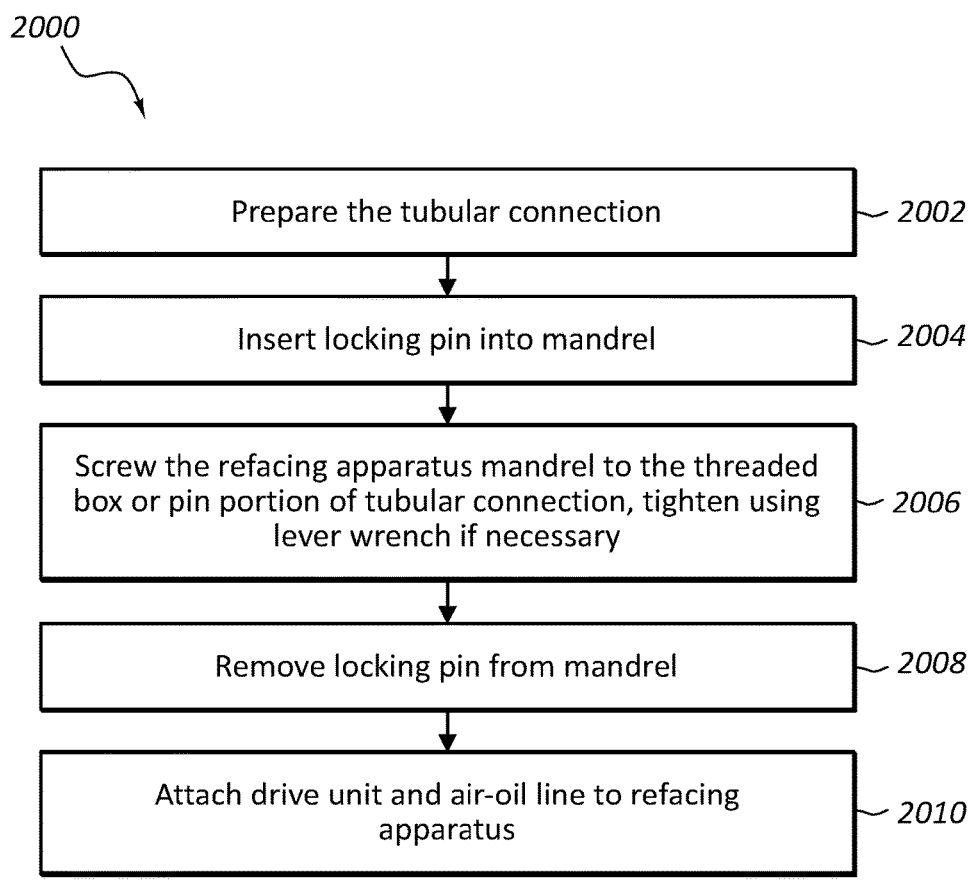
FIG. 20 is a flowchart showing an example embodiment method of installing a refacing apparatus to a tubular connection.

FIG. 20 is a flowchart showing an example embodiment method of installing a refacing apparatus to a tubular connection 2000. In the method 2000, box 2002 describes a step of cleaning the tubular connection. The tubular connection may be cleaned, for example, by dispensing compressed air and/or oil from the air-oil system to the threads and faces of the tubular connection, removing any existing debris or other material that may interfere with refacing. In some embodiments, the tubular connection may be cleaned before the method 2000 is practiced.

Box 2004 describes a step of inserting a locking pin into the mandrel of the refacing apparatus. The locking pin may be advantageously used as described elsewhere in this disclosure, such as by locking the rotation of the mandrel to the rotation of a primary face plate. By inserting the locking pin, the mandrel may rotate with the face plate even though a bearing is disposed between the mandrel and the drive shaft of the refacing apparatus. In some embodiments, the locking pin may synchronize the rotation of the engaging nut or torque-stop face plate instead (or in addition to) locking to the rotation of the primary face plate. The rotation lock may allow screwing the refacing apparatus mandrel to the threaded box or pin portion of the tubular connection, as described in box 2006. For example, if the mandrel is locked to the primary face plate, handles on the primary face plate may be used to assist in screwing the mandrel to the tubular connection. In some embodiments, a wrench or wrench lever may be inserted into a portion of the refacing apparatus to provide additional leverage in tightening the mandrel into place. For example, a wrench may be removably insertable to the primary face plate and extend radially from the face plate to provide additional leverage in rotating the face plate, which, due to the locking pin, provides additional leverage in rotating the mandrel. With the mandrel in position, such as when the face plates are properly positioned to provide refacing of the tubular connection using their cutters and the mandrel is sufficiently tightly engaging the tubular connection, the locking pin may be removed from the mandrel, as shown in box 2008.

Box 2010 describes attaching a drive unit and air-oil line to the refacing apparatus, completing the basic installation method 2000 of the refacing apparatus and preparing it for refacing of the tubular connection. Attaching the drive unit may entail attaching a driver of a drive unit to a driving nut of the refacing apparatus.

Figure 21:
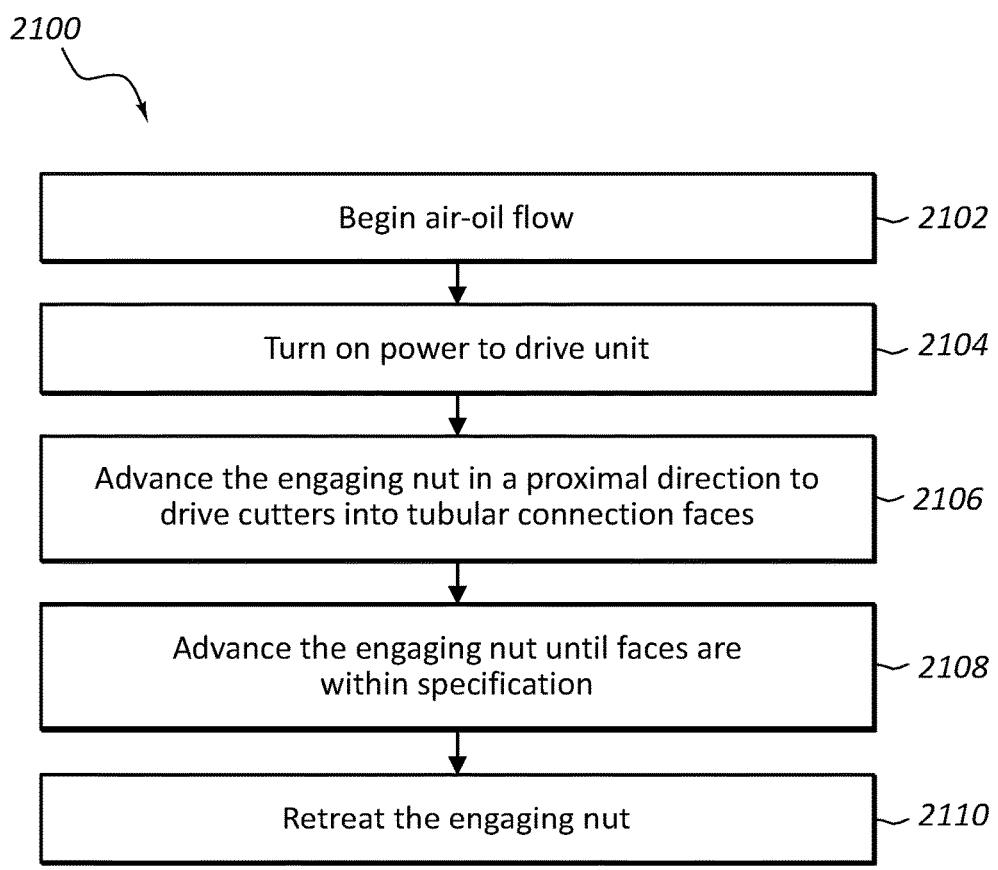
FIG. 21 is a flowchart showing an example embodiment method of refacing using a refacing apparatus installed at a tubular connection.

FIG. 21 is a flowchart showing an example embodiment method of refacing 2100 using a refacing apparatus installed at a tubular connection. In the method 2100, box 2102 describes beginning air-oil flow to the cutting surfaces. This step may require opening an air valve or other valve that restricts flow of air and/or oil to a cutting surface. In one embodiment, an air/oil mixture is added at approximately 120 PSI. At box 2104, a step is described where the drive unit has its power turned on. In some embodiments, the drive unit may use a preset rotational velocity, but an adjustable-speed drive unit may also be used. For example, in some embodiments, the drive unit may turn the drive shaft of the refacing apparatus at approximately ten (10) to twenty (20) revolutions per minute (RPM), and preferably at approximately fifteen (15) RPM. These low speeds are achieved due to the design of the refacing apparatus. Providing cutting at a low speed may provide safety even when moving parts are accessible and may decrease a need for heavy lubrication at the cutting surface. This may allow an atomized oil-air composition to suffice in providing lubricant and cooling to the refaced surfaces.

Box 2106 describes the step of advancing the engaging nut in a proximal direction to drive cutters into the tubular connection faces. In some embodiments, the drive unit may drive rotation of the entire apparatus after installation except for the mandrel tightened to the tubular connection. Therefore, as long as the drive unit is rotating the apparatus in the proper direction, the engaging nut may advance along a threaded portion of the drive shaft toward the tubular connection by being held in place while the remainder of the apparatus continues to rotate. This feature may provide simplicity and ease to the operation of the apparatus and allows an individual operator to control the drive unit and the advancement of the engaging nut simultaneously. For example, the operator may hold the drive unit control with one hand and hold the engaging nut, when appropriate, with the other hand while watching the cutters reface the tubular connection at a relatively low level of RPM, as compared with conventional refacers and grinders.

Box 2108 describes that the engaging nut and cutters are advanced until the faces of the tubular connection are brought within specification. The engaging nut may need to be advanced several turns to allow the cutters to completely remove warping, dents, scratches or other features outside specification while refacing, but in some instances very little material may be removed by the cutters and the engaging nut only needs to be advanced a low number of turns. The distance between threads on the engaging nut may be advantageously chosen to balance providing fine-tuned adjustment of the cutters against providing speed in refacing. This feature provides adaptability of the refacing apparatus so that each tubular connection is only refaced to the amount necessary to comply with specifications, prolonging cutting tool life span, reducing energy and lubricant needed to reface connections, and increasing the potential number of times that a tubular connection can be refaced while remaining within specifications.

Box 2110 describes the optional additional step of retreating the engaging nut. By doing so, the cutters may be removed from contact with the tubular connection faces. This may decrease the chances that the cutters or refaced surface may be damaged as the refacing apparatus is removed. This may also allow easier inspection of the refaced surface and may permit the air-oil system to clear away particles and debris from the refaced surfaces prior to disconnection or cutting off the flow of air to the refacing apparatus. In some embodiments, a new or different cutting element may be installed for additional refacing of the tubular member after initially retreating the engaging nut as described in box 2110 and the apparatus is removed from the tubular member. Additional refacing may in some embodiments entail repeating steps 2102 through 2110 until the desired finished surface is obtained.

Figure 22:
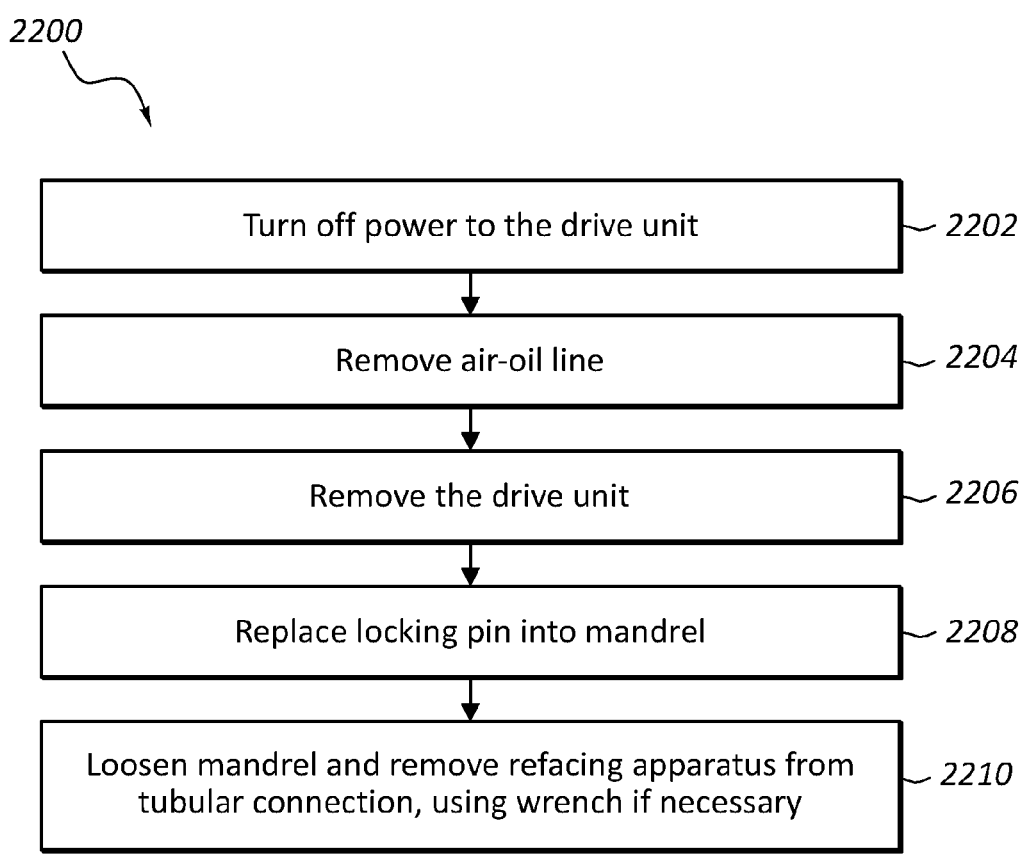
FIG. 22 is a flowchart showing an example embodiment method of removing a refacing apparatus installed at a tubular connection.

FIG. 22 is a flowchart showing an example embodiment method 2200 of removing a refacing apparatus installed at a tubular connection. In the method 2200, box 2202 describes turning off power to the drive unit. Box 2204 then describes removing the air-oil line. In some embodiments, this step may include closing an air supply valve and oil supply valve before removing an air chuck from the refacing apparatus. Box 2206 then describes removing the drive unit. With the air-oil line removed, the drive unit may be removed by sliding the drive unit proximally from the drive nut on the refacing apparatus. Box 2208 describes replacing the locking pin into the mandrel. This may also include replacing the locking pin through another portion of the refacing apparatus, such as the primary face plate, to assist in removing the mandrel from the tubular connection. With the locking pin replaced, box 2210 describes loosening the mandrel from the tubular connection and removing the refacing apparatus entirely. As with the installation step described in connection with box 2006, a lever wrench may be employed to improve leverage for the user to complete the desired removal when the mandrel is difficult to loosen by hand or by grasping the portions of the apparatus locked to the mandrel by the locking pin.

One advantage that may be obtained by some embodiments disclosed herein is a portable refacing apparatus. Apparatuses and methods disclosed herein may provide an apparatus operable to reface a tubular connection wherever a source of electricity can be obtained, so they can be applied in remote oilfield locations as needed. This may greatly reduce response time when tubular connections are identified as out of specification and may reduce costs of moving large equipment or tubular connections for machining. Refacing apparatus described herein may be portable by a single technician and transported using small vehicles, even when an air compressor, oil reservoir, and electricity generator are brought along.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. An apparatus for refacing tubular connections, the apparatus comprising:
   a mandrel having a central opening configured to receive a tubular connection;
   a drive system coupled to the mandrel, the drive system being rotatable independent of the mandrel, the drive system including an engagement portion, a distal faceplate, and a proximal faceplate, the distal faceplate and the proximal faceplate each being adapted to connect to a plurality of cutters, the mandrel being rotationally lockable relative to the distal faceplate;
   an engaging nut movably connected to the engagement portion of the drive system, the engaging nut being linked to the distal and proximal faceplates and providing longitudinal movement of the plurality of cutters upon longitudinal movement of the engaging nut along the engagement portion of the drive system.

2. The apparatus of claim 1, wherein the engagement portion is threaded to the engaging nut.

3. The apparatus of claim 1, further comprising a drive unit, the drive unit operable to provide a torque to the drive system.

4. The apparatus of claim 1, wherein the plurality of cutters are configured to engage at least two faces of a tubular connection simultaneously.

5. The apparatus of claim 1, wherein the plurality of cutters comprises a bevel cutter and a face cutter.

6. The apparatus of claim 1, wherein the mandrel comprises threads, the threads configured to threadably engage a tubular connection.

7. The apparatus of claim 1, wherein the mandrel is rotationally lockable by a pin extending through the proximal faceplate.

8. The apparatus of claim 1, wherein the proximal and distal faceplates are linked around outer perimeters of the proximal and distal faceplates.

9. The apparatus of claim 1, further comprising a bearing positioned between the mandrel and the drive system.

10. A method of refacing a tubular connection, the method comprising:
   attaching a mandrel to an end of a tubular connection, the tubular connection having at least one face, the mandrel being connected to a cutter apparatus, the cutter apparatus having a drive system and at least one faceplate configured to be driven by the drive system, the drive system having a drive shaft threadably engaged to a drive nut, the at least one faceplate having at least one cutter;

rotating the at least one faceplate relative to the tubular connection using the drive system without simultaneously rotating the mandrel;

advancing the at least one cutter into contact with the at least one face of the tubular connection by rotating the drive nut relative to the drive shaft;

removing material from the at least one face with the at least one cutter.

11. The method of claim 10, wherein attaching the mandrel to the end of the tubular connection comprises synchronously rotating the mandrel and the cutter apparatus.

12. The method of claim 10, wherein the mandrel is attached to the tubular connection by threadably engaging the end of the tubular connection.

13. The method of claim 10, wherein the at least one face of the tubular connection comprises a proximal face and a distal face, and the at least one faceplate comprises at least a proximal faceplate and a distal faceplate, wherein advancing the proximal and distal faceplates includes advancing the proximal faceplate toward the proximal face and advancing the distal faceplate toward the distal face.

14. The method of claim 13, wherein the proximal and distal faceplates are advanced simultaneously.

15. An apparatus for refacing a tubular connection, the apparatus comprising:

a mounting portion configured to mount to a tubular connection;

a drive shaft rotatable independent of the mounting portion, the drive shaft having a threaded portion;

a drive nut engaging the threaded portion of the drive shaft, the drive nut being linked to a cutter configured to remove material from the tubular connection upon advancement of the cutter toward the tubular connection, wherein the drive nut is configured to travel along the threaded portion of the drive shaft upon the drive nut being held rotationally stationary relative to the drive shaft to advance the cutter into contact with the tubular connection to remove material.

16. The apparatus of claim 15, wherein the mounting portion mounts to an outside surface of the tubular connection.

17. The apparatus of claim 1, wherein at least a first cutter and a second cutter of the plurality of cutters are mounted to at least one faceplate of the distal and proximal faceplates, wherein the first and second cutters are axially spaced relative to the at least one faceplate.

18. The apparatus of claim 1, wherein the plurality of cutters are adapted to simultaneously reface a surface of the tubular connection and an edge of the surface.

19. An apparatus for refacing tubular connections, the apparatus comprising:

a mandrel having a central opening configured to receive a tubular connection;

a drive system coupled to the mandrel, the drive system being rotatable independent of the mandrel, the drive system including an engagement portion, a distal faceplate, and a proximal faceplate, the distal faceplate and the proximal faceplate each being adapted to connect to a plurality of cutters;

an engaging nut threadably connected to the engagement portion of the drive system, the engaging nut being linked to the distal and proximal faceplates and providing longitudinal movement of the plurality of cutters into contact with the tubular connection to remove material from the tubular connection upon rotational movement of the engaging nut relative the engagement portion of the drive system.

20. A method of refacing a tubular connection, the method comprising:

attaching a mandrel to an end of a tubular connection, the tubular connection having at least one face, the mandrel being connected to a cutter apparatus, the cutter apparatus having a drive system and at least one faceplate configured to be driven by the drive system, the at least one faceplate having at least one cutter;

rotating the at least one faceplate relative to the tubular connection using the drive system without simultaneously rotating the mandrel;

advancing the at least one cutter into contact with the at least one face of the tubular connection;

removing material from the at least one face with the at least one cutter;

wherein attaching the mandrel to the tubular connection includes rotationally locking the mandrel relative to the distal faceplate.

* * * * *